(12) United States Patent
Wright et al.

(10) Patent No.: US 12,494,279 B2
(45) Date of Patent: Dec. 9, 2025

(54) SYSTEM AND METHOD FOR DATA VISUALIZATION

(71) Applicant: datma, Inc., Beaverton, OR (US)

(72) Inventors: Hollis Wright, Portland, OR (US); Ganapati Srinivasa, Portland, OR (US)

(73) Assignee: datma, Inc., Beaverton, OR (US)

( * ) Notice: Subject to any disclaimer, the term of this patent is extended or adjusted under 35 U.S.C. 154(b) by 1014 days.

(21) Appl. No.: 17/449,764

(22) Filed: Oct. 1, 2021

(65) Prior Publication Data

US 2022/0108786 A1    Apr. 7, 2022

Related U.S. Application Data

(60) Provisional application No. 63/087,003, filed on Oct. 2, 2020.

(51) Int. Cl.
*G16H 30/20* (2018.01)
*G16H 50/20* (2018.01)

(52) U.S. Cl.
CPC ............. *G16H 30/20* (2018.01); *G16H 50/20* (2018.01)

(58) Field of Classification Search
CPC .................................................... G16H 30/20
USPC .......................................................... 715/700
See application file for complete search history.

(56) References Cited

U.S. PATENT DOCUMENTS

| | | | | |
|---|---|---|---|---|
| 5,649,080 A * | 7/1997 | Minakata | ............... | G06T 19/00 345/443 |
| 8,626,750 B2 * | 1/2014 | Mandel | ............... | G06F 16/9535 715/781 |
| 10,304,564 B1 * | 5/2019 | Reicher | ................. | G16H 30/20 |
| 11,559,272 B2 * | 1/2023 | Jackson | ................ | A61B 6/503 |
| 2002/0163546 A1 * | 11/2002 | Gallo | .................... | G06F 3/0481 715/848 |
| 2005/0168460 A1 * | 8/2005 | Razdan | ............... | G06F 16/2428 345/419 |
| 2005/0191743 A1 * | 9/2005 | Wu | ...................... | C12N 5/0648 435/366 |
| 2006/0242146 A1 * | 10/2006 | Piacsek | ................ | G06V 10/443 |
| 2007/0276214 A1 * | 11/2007 | Dachille | ............... | G16H 30/40 600/407 |
| 2008/0285844 A1 * | 11/2008 | Romney | ................ | G01J 3/465 708/401 |
| 2011/0102559 A1 * | 5/2011 | Nakane | ............... | H04N 13/139 348/54 |

(Continued)

*Primary Examiner* — Reza Nabi
(74) *Attorney, Agent, or Firm* — Lee & Hayes, P.C.

(57) ABSTRACT

Methods and systems are provided for viewing multi-modal data in three dimensions. In one example, a method for visualizing and manipulating multi-modal features of a plurality of data objects includes accessing a plurality of datasets associated with a subject of interest, where data in the plurality of datasets changes in real-time; displaying a hub object representing the subject of interest; dynamically displaying a plurality of axis objects associated with the subject of interest, each comprising a representation of a summary metric of a respective dataset of the plurality of datasets and each displayed proximate the hub object, including adjusting a length and/or intensity of one or more of the plurality of axis objects as the data change; and in response to selection of a first axis object, displaying a first track object including a plurality of representations of data points within a first dataset of the plurality of datasets.

19 Claims, 13 Drawing Sheets

(8 of 13 Drawing Sheet(s) Filed in Color)

(56) References Cited

U.S. PATENT DOCUMENTS

| | | | | |
|---|---|---|---|---|
| 2011/0249094 | A1* | 10/2011 | Wang | H04N 19/597 |
| | | | | 709/219 |
| 2014/0043436 | A1* | 2/2014 | Bell | G06V 20/653 |
| | | | | 348/46 |
| 2018/0051249 | A1* | 2/2018 | Hingtgen | A61K 35/30 |
| 2018/0064854 | A1* | 3/2018 | Hingtgen | A61L 27/54 |
| 2018/0260950 | A1* | 9/2018 | Samset | G06T 7/0012 |
| 2019/0108637 | A1* | 4/2019 | Su | G06T 11/60 |
| 2019/0156531 | A1* | 5/2019 | Vallapuzha | G01N 21/954 |
| 2019/0333644 | A1* | 10/2019 | Lamarre | G16H 10/60 |
| 2021/0027883 | A1* | 1/2021 | Kumar | G16H 40/20 |
| 2021/0076966 | A1* | 3/2021 | Grantcharov | G06N 20/00 |
| 2021/0309582 | A1* | 10/2021 | Zicari | B01D 53/18 |
| 2022/0108786 | A1* | 4/2022 | Wright | G16H 30/20 |
| 2022/0235328 | A1* | 7/2022 | Schwiebert | C12N 5/0686 |
| 2022/0351838 | A1* | 11/2022 | Pedemonte | G06T 11/00 |
| 2023/0048252 | A1* | 2/2023 | Sasidharan | G16H 50/20 |
| 2023/0157757 | A1* | 5/2023 | Braido | G16H 30/40 |
| | | | | 345/419 |
| 2023/0157762 | A1* | 5/2023 | Braido | A61B 34/37 |
| | | | | 600/424 |
| 2023/0410985 | A1* | 12/2023 | Brynolfsson | G06T 7/11 |
| 2024/0127969 | A1* | 4/2024 | Amble | G16H 80/00 |
| 2024/0335537 | A1* | 10/2024 | Bajgain | A61K 40/31 |
| 2024/0350422 | A1* | 10/2024 | Steinmetz | A61K 35/76 |
| 2024/0386583 | A1* | 11/2024 | Kobayashi | A61B 6/504 |
| 2025/0014719 | A1* | 1/2025 | Su | G16H 50/70 |

\* cited by examiner

SYSTEM AND METHOD FOR DATA VISUALIZATION

CROSS REFERENCE TO RELATED APPLICATIONS

This application claims priority to U.S. Provisional Application No. 63/087,003, entitled "System and Method for Data Visualization", and filed on Oct. 2, 2020. The entire contents of the above-referenced application are hereby incorporated by reference for all purposes.

STATEMENT OF GOVERNMENT INTEREST

This invention was made, at least in part, with government support under Award No. 1831085, Amendment 003 awarded by the National Science Foundation. The U.S. government has certain rights in the invention.

FIELD OF TECHNOLOGY

The present description relates generally to visualizing multi-modal data in three dimensions.

BACKGROUND

Individuals are increasingly faced with the challenge of processing and reconciling vast amounts of disparate data. Standard two-dimensional (2D) methods of visualization such as graphs, plots, and charts provide limited information which may be increasingly difficult to interpret as the complexity of the underlying data sets increase. While three-dimensional (3D) visualization has proven beneficial for gaining an understanding of relationships among data sets for subjects of interest, current methods of information storage and presentation limit the analytics and modeling that may be applied to such data sets.

Frequently, various relevant data sources for a subject of interest may be located in different storage locations and in different formats. For example, patient data may include gene expression data, gene sequence data, various types of imaging (e.g. CT scan, PET scan, x-ray, MRI), blood tests, environmental data, lifestyle data, symptomology, and lab tests from one or more points of time. Manufacturing data may include transportation costs, labor costs, energy costs, and raw material costs from one or more points in time. Consumer data may include personally identifiable information, engagement data, behavioral data, attitudinal data, and household data from one or more points in time. The underlying information for each of these types of data may be collected from different sources and stored in different formats at different locations accessible by different protocols. As a result, a user desiring to compare or analyze the data may be forced to navigate through different tables, spreadsheets, graphs, and/or other 2D or 3D data representations/visualizations and individually analyze each data source, which may stymie efforts to recognize patterns, correlations, similarities, differences, etc., in the datasets among the subjects of interest. Further, current visualization methods may be limited to the presentation of summary information, limiting access to relevant underlying data and relying on previous assumptions as to how the underlying data should be grouped.

SUMMARY

Systems and methods described herein disclose a method for visualizing and manipulating multi-modal features of a plurality of data objects, the method comprising accessing a plurality of datasets associated with a subject of interest, where data in the plurality of datasets changes in real-time; displaying a hub object comprising a representation of the subject of interest; dynamically displaying a plurality of axis objects associated with the subject of interest, the plurality of axis objects each comprising a representation of a summary metric of respective dataset of the plurality of datasets and each displayed proximate the hub object, the dynamically displaying including adjusting a length and/or intensity, or other visual aspect of one or more of the plurality of axis objects as data in the plurality of datasets change; and in response to selection of a first axis object of the plurality of axis objects, displaying a first track object, the first track object including a plurality of representations of data points within a first dataset of the plurality of datasets.

To the accomplishment of the foregoing and related ends, certain illustrative aspects of the system are described herein in connection with the following description and the attached drawings. The features, functions, and advantages that have been discussed can be achieved independently in various embodiments of the present disclosure or may be combined in yet other embodiments, further details of which can be seen with reference to the following description and drawings. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
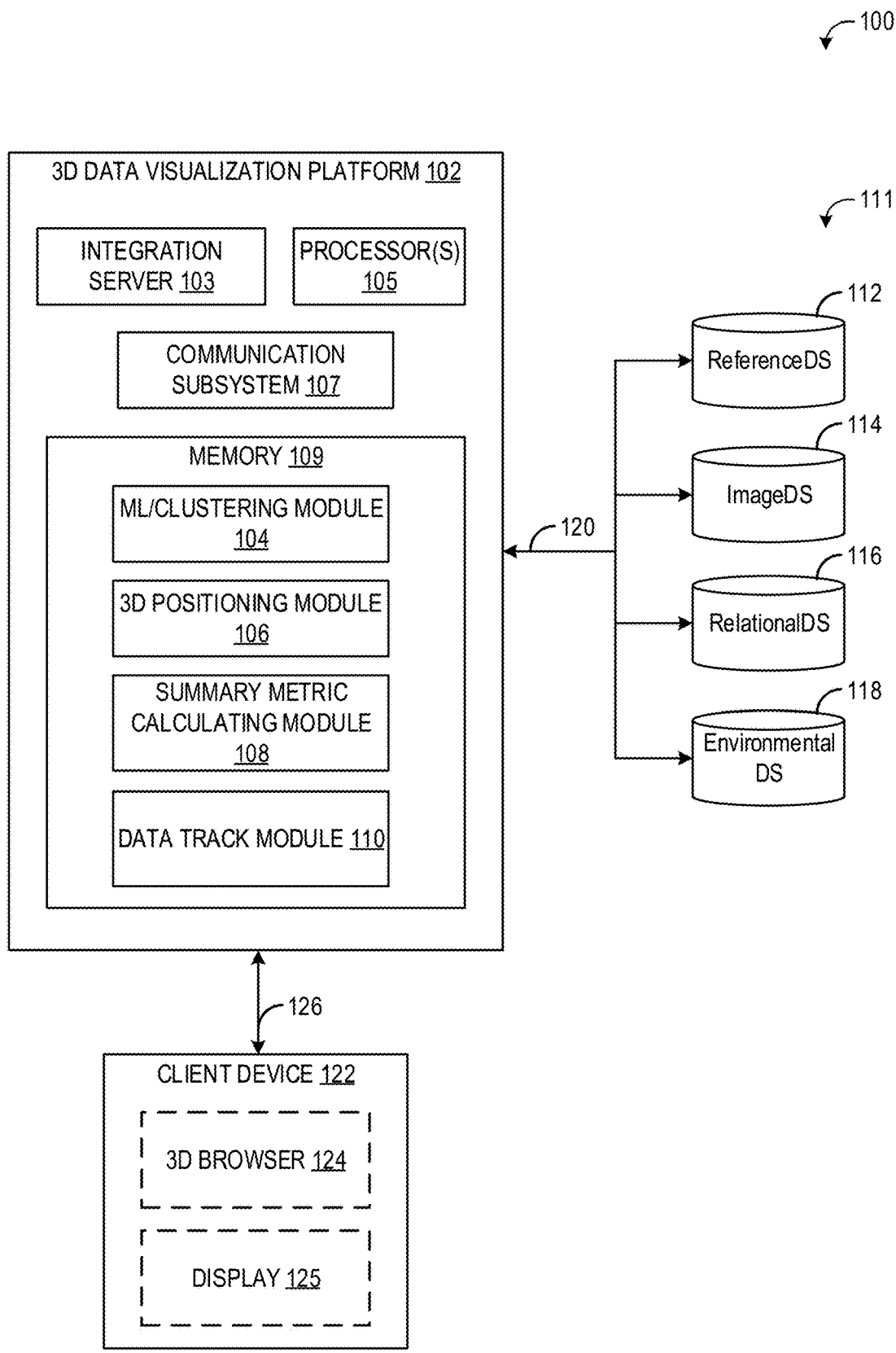
FIG. 1 schematically shows an example 3D visualization system including a 3D browser according to embodiments of the disclosure.

The following description relates to a three dimensional (3D) data visualization platform for representing relationships and assumptions from analytic models in complex multi-modal data sets utilizing 3D computer graphics suitable for use on traditional displays as well as virtual reality (VR) and augmented reality (AR) display technologies for both single-user and multi-user simultaneous applications. The 3D visualization platform may utilize a combination of positional relationships among summary data objects (e.g. a patient in a biomedical data store, a stock in a financial data set, etc.) and multi-scale data representations of specific data attached to each data object to achieve simultaneous multi-scale visualization of relationships between data objects and their corresponding individual data that is novel and not possible to achieve outside of 3D representations. The 3D data visualization platform may additionally utilize transformations of the data objects (e.g. reconfiguration of data objects in space and/or their corresponding individual data representations, including but not limited to temporally-based changes in these positions or the data represented) to allow users to more easily recognize important patterns of similarity or difference within the data. Further, the 3D data visualization platform allows for real-time manipulation of underlying and summary data, allowing for the creation and testing of various models and relationships between different aspects of the data from the same or different data sets. Such a manipulation of underlying and summary data may allow for the questioning and updating of previous conclusions or prior models as the data and understanding of the relationships between the data continues to evolve.

The platform additionally provides access within the platform to the underlying data included in each data set regardless of source and format, allowing a user to view and manipulate data underlying any summary representation. For example, for a given data set, a summary metric for the data set may be viewed initially, and then in response to a user request, the data in the data set that makes up the summary metric may be visualized via the platform, without requiring the user to navigate to another page, application, or device. By allowing the user to view and manipulate the underlying data for a plurality of data sets via the 3D data visualization platform, the need to navigate through different data visualization/storage platforms may be avoided, which may allow the user to quickly compare data among subjects of interest, challenge previous assumptions, recognize patterns in the underlying data, and so forth.

The 3D data visualization platform described herein may be applied across many disciplines of science and industry, especially with regard to enabling human understanding of embeddings of complex multi-dimensional data into space as determined by dimensionality reduction algorithms and/or artificial intelligence (e.g. "deep learning" or causal reasoning) algorithms; these include, but are not limited to, the biomedical sciences, financial markets, consumer and manufacturing, logistics, control systems, and energy production and consumption, among other industries. The 3D data visualization platform may be applied to historical and/or real-time data, for example allowing for event classification/monitoring for time-sensitive applications such as computer network intrusion monitoring or patient monitoring whether at home or in a hospital or clinical setting.

FIG. 1 schematically shows an example 3D data visualization system 100 that includes a 3D data visualization platform 102, a plurality of data sources 111, and a client device 122 coupled via one or more networks, such as networks 120 and 126. In some embodiments, system 100 may include many more components that those shown in FIG. 1. However, it is not necessary that all of these generally conventional components be shown in order to disclose an illustrative embodiment.

3D data visualization platform 102 may be in the form of a desktop PC, server, workstation, mobile phone, laptop, tablet, set-top box, appliance, or other computing device(s) that include resources (e.g., memory and processor(s)) allocated to obtain and process complex multi-modal datasets for visualization. Such devices may be physical or virtual computing environments located locally or through a distributed or cloud based system. As will be explained in more detail below, the datasets may include a plurality of sets of related datasets, where each set of related datasets is specific to a respective subject of interest (e.g., a patient, a stock, a period of time) and the related datasets are datasets associated with/corresponding to the subject of interest. Data sets may be specific for a single point in time or may include a continuum of data that may be assigned to a series of points in time.

In various embodiments, platform 102 may comprise one or more physical and/or logical devices that collectively provide the functionalities described herein. In some embodiments, platform 102 includes an integration server 103, one or more processors 105, a memory 109, and a communication subsystem 107. While not shown in FIG. 1, platform 102 may include additional web servers, and/or may be part of a distributed computing system representing one or more storage repositories configured for shared storage access for nodes within a cluster computing system using distributed computing technologies.

Collectively, the various tangible components or a subset of the tangible components may be referred to herein as "logic" configured or adapted in a particular way, for example as logic configured or adapted with particular software, hardware, or firmware. In some aspects, logic and memory may be integrated into one or more common devices, such as an application specific integrated circuit, field programmable gate array, or a system on a chip.

Platform 102 may be configured to execute one or more instructions that are part of one or more applications, services, programs, routines, libraries, objects, components, data structures, or other logical constructions. Such instructions may be implemented to perform a task, implement a data type, transform the state of one or more devices, or otherwise arrive at a desired result.

Platform 102 may include a logic subsystem including the one or more processors 105 that are configured to execute software instructions. Additionally or alternatively, the logic subsystem may include one or more hardware or firmware logic machines configured to execute hardware or firmware instructions. The processors may be single core or multicore, and the programs executed thereon may be configured for parallel or distributed processing. The processors may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

In some embodiments, platform 102 may comprise one or more computing resources provisioned from a "cloud computing" provider. "Cloud computing" or of/in "the Cloud" as used herein refers to a model for enabling ubiquitous, convenient, on-demand network access to a shared pool of configurable computing resources that can be rapidly provisioned and released with minimal management effort or service provider interaction. Clouds can be private, public, or a hybrid of private and public, and may include Infrastructure as a Service (IaaS), Platform as a Service (PaaS) and Software as a Service (SaaS).

Memory 109 generally comprises a random access memory ("RAM") and permanent non-transitory mass storage device, such as a hard disk drive or solid-state drive. Memory 109 may store an operating system as well as the various modules discussed below. Software components may be loaded into memory 109 using a drive mechanism (not shown) associated with a non-transitory computer-readable medium, such as optical memory (for example CD, DVD, HD-DVD, Blu-Ray Disc, memory stick, and the like) and/or magnetic memory devices (for example hard disk drive, floppy disk drive, tape drive, MRAM, and the like). It may further include devices which are one or more of volatile, non-volatile, dynamic, static, read/write, read-only, random access, sequential access, location addressable, file addressable and content addressable.

Communication subsystem 107 may be configured to communicatively couple platform 102 with one or more other computing devices. Such connections may include wired and/or wireless communication devices compatible with one or more different communication protocols including, but not limited to, the Internet, a personal area network, a local area network (LAN), a metropolitan area network, a wide area network (WAN) or a wireless local area network (WLAN). For example, wireless connections may be WiFi, Bluetooth®, IEEE 802.11, WiMAX, LTE, cellular and the like.

Client device 122 may be any computing or mobile device, for example, mobile devices, tablets, laptops, desktops, PDAs, and the like, as well as virtual reality devices or augmented reality devices. The client device 122 may be configured to communicate with platform 102 via a data transmission network 126. The client device 122 may include, or be coupled to, display devices, storage devices, or other devices that may send and receive data to the platform 102 and may remotely process or send data to be processed by the platform 102 or another device. As shown, client device 122 includes a 3D browser 124 and a display 125. Display 125 may be used to present a visual representation of data held within memory 109 or stored on client device 122. As the herein described methods and processes change the data held in the memory 109, the state of the information displayed may also change. For example, display 125 may be used to present a visual representation of data using, for example, a "graphics processing unit" (GPU), a processing unit that comprises a programmable logic chip (processor) specialized for display functions. The GPU may render images, animations, and video for a computer screen. The GPU may be located on plug-in cards, in a chipset of a motherboard of a computer, or in the same chip as the central processing unit (CPU) of client device 122. The GPU may perform parallel operations on multiple sets of data, and thus may be used as vector processors for non-graphics applications which involve repetitive computations. Client device 122 may include one or more user input devices, such as a keyboard, mouse, touch screen, trackball, natural user interface, etc.

Communication within the system 100 may occur locally or over one or more public/private/hybrid networks 120, 126 including one or more of a wireless network, a wired network, or a combination of wired and wireless networks. Suitable networks include, but are not limited to, public, private or hybrid networks including the Internet, a personal area network, a LAN, a WAN, or a WLAN. Information can further be received or transmitted over cellular networks either directly or through a base station.

Network devices may include local area network devices such as routers, hubs, switches, or other computer networking devices. Storage devices may include, but are not limited to, secondary, tertiary or auxiliary storage, such as large hard drives, servers, and virtual memory. Storage devices may include portable or non-portable storage devices, optical storage devices, and various other media capable of storing, including, or containing data.

The 3D data visualization platform 102 may be independently used to access, process and/or display one or more multi-modal data sets utilizing three-dimensional computer graphics. Datasets may include a plurality of sets of related datasets, where each set of related datasets is specific to a respective subject of interest (e.g., a patient, a stock) and the related datasets are datasets associated with/corresponding to the subject of interest. For example, each set of related datasets may include test results, gene expression data, mutation data, diagnostic imaging information, treatments, etc., for a specific patient. In some aspects, each data set may be narrowed to specific points or segments of time, for example, before or after commencing a particular treatment regimen, or after a treatment has been administered for a set length of time. In another example, each set of related datasets may include earnings, debt to equity ratio, price to earnings ratio, dividends, volatility, forward curves, and price as well as other financial data, metrics and calculations. Specific points of time may include, for example, before or after a management change, before or after a product launch, or before or after a specific economic event. In some aspects, datasets may include both macro and micro economic data including economic indices or technical trading calculations. It is understood that each data set may include single or multi-modal information. Each set of related datasets for a particular subject may be processed via the 3D data visualization platform and multiple related datasets may be combined to generate a data object.

Each data object may visually represent the multi-dimensional data included in the corresponding set of related datasets. For example, each data object may include a hub object, one or more axis objects, and one or more track objects, which may represent the corresponding data in a hierarchical manner. For example, a data object may include a hub object that represents a subject of interest as a whole (e.g., a patient or a financial instrument such as a mutual fund, ETF. bond, stock, option, swap, and the like) and a plurality of axis objects, where each axis object represents an aspect (e.g., a principal component, an average value, a variance, etc.) of a respective dataset of the set of related datasets as a whole. The data object may further include a plurality of track objects, where each track object represents a respective dataset of the set of related datasets on a more granular level, such as by including representations of actual data points of the corresponding dataset. A user may view a plurality of data objects relating to different subjects of interest at one time in 3D display space, where aspects of the underlying data used to generate the data objects may be visualized within the platform for easy comparison among subjects of interest, as will be explained in more detail below.

The platform 102 may include an integration server 103, a machine learning (ML)/clustering module 104, a 3D positioning module 106, a summary metric calculating module 108, and a data track module 110, each of which may be applied to compile the plurality of sets of related datasets, generate 3D data objects representing each set of related datasets, and/or position the generated 3D data objects in three-dimensional display space. In some examples, at least some of the data of the plurality of sets of related datasets may be obtained from the plurality of data sources 111 and integrated automatically via the integration server 103.

Once generated, the data objects may be viewed on a client device, such as client device 122, via a 3D browser, such as 3D browser 124. Further, in some examples, a user may enter one or more requests to the 3D data visualization platform via the client device 122, such as a request to view data objects for a plurality of subjects of interest. In response to the request, the integration server 103 may obtain data from the plurality of data sources 111 and integrate the data to form the plurality of related datasets. In some examples, additionally or alternatively, some or all of the data used to form the plurality of related datasets may be sent to the 3D data visualization platform from client device 122 or another remote device.

The ML/clustering module 104 may include one or more machine learning, causal, or other types of models that may be applied to determine similarities and/or differences among sets of related datasets, in order to cluster the sets of related datasets. The 3D positioning module 106 may apply the output of the ML/clustering module 104 in order to determine positions in 3D display space for the data objects. The summary metric calculating module 108 may calculate one or more summary metrics for each dataset of the plurality of sets of related datasets, which may be used to generate the axis objects of each data object. The data track module 110 may generate track objects and associated decorations, which may visually represent the data in each dataset. Each module may include processor-executable instructions stored in memory to execute the methods described herein.

The platform 102 may obtain raw data and process the raw data as described herein in order to generate the 3D data objects. The raw data may be extracted/compiled and supplied by an external source (e.g., a researcher, clinician, or economist via client device 122) in one or more suitable formats, such as flat files. Generally, compiling relevant data that may be useful for evaluating complex parameters, such as comparing patient status relative to other patients, may be challenging due to the large amount of data and data in different formats, storage locations, and the like. As an example, some patient information, such as diagnoses, treatments, and presenting symptoms may be stored in an electronic health record (EHR) system. However, other patient information, such as patient genetic sequence information, may not be supported in the EHR system. Without an ability for inbuilt analytics, such as the analytics provided in system 100, clinicians or researchers may have to manually extract and analyze the data, which given the different data types and storage locations, may be time consuming and require specialized technical expertise, which may limit the data that is extracted, the number of subjects of interest that may be analyzed, and so forth.

For example, relevant data may be siloed data, where various data records such as medical data records may be kept in data silos in which information systems or subsystems are incapable of reciprocal operation with others that are, or should be, related, making data sharing and compilation a time consuming, manual exercise. These disparate storage systems can make it challenging to deduce cross-correlations and can prevent generalized applications of machine learning to the collective data. Further, each silo may have different security and access requirements increasing the level of complexity and difficulty in accessing even individual records. For example, when accessing data stored in data silos, a user may identify, access, and open each of the separate data sources (e.g. opens EHR, imaging, pathology, and genomic sequence data sources), identify how and where the desired information is stored (e.g., which data source, what file format, how the data source stores and organizes information, what specific fields provide the desired information, how to obtain information from a particular source), and then perform the desired operations serially to identify the individuals who may be used to create a desired cohort. Further, many databases require a user to enter requests using imperative queries which require an extensive knowledge of the language and technical understanding of physical implementation details prior to usage. The storage of relevant data in data silos may reduce or prevent the ability to conduct any meaningful analysis of relevant data on an individual or group of individuals.

Thus, platform 102 (via integration server 103) may apply automated data integration of multiple data types across multiple data sites and systems, leveraging a framework of scalable data sources in which relevant data may be stored. The plurality of data sources 111 as illustrated includes a reference data source 112 (ReferenceDS), an image data source 114 (ImageDS), a relational data source 116 (RelationalDS), and an environmental data source 118 (EnvironmentalDS). The reference data source 112 may store genomic information such as whole genome sequences, exomes, genomic panels, transcriptomes, etc. The genomic information may include population-wide genomic information (e.g., a database of small nucleotide polymorphisms) as well as patient-specific genomic information (e.g., a mutation burden panel for a specific patient). The image data source 114 may store pathology images, radiology images, multiplexed biomarker images, and other diagnostic images in a patient-specific manner. The relational data source 116 may store structured query language (SQL) and variations thereof as well electronic health records, including lab results, pharmacy information, billing/claims data, etc. The environmental data source 118 may store environmental information, including but not limited to patient travel histories, information relating to historical events, and geographical information (including weather information, air quality information, and environmental toxin information).

The plurality of data sources 111 illustrated in FIG. 1 is presented as an example of data sources that may be accessed to generate data objects representing a collection of data such as patient medical data. However, the plurality of data sources 111 may include other suitable data sources that may be accessed to generate data objects representing other suitable types of data, including but not limited to stock data, patient monitoring data, energy usage data, business logistics data, and so forth. Accordingly, for stock data, the plurality of data sources 111 may store (e.g., across one or more data sources) earnings growth, debt to equity ratio, price to earnings ratio, management, dividends, cash flow, net margins, return on equity, return on assets, supply chain, transportation, price to book ratio, industry trends, raw material pricing, earnings per share, valuation, etc., for each of a plurality of companies. In some examples, the stock data may include data that may impact stock prices or company valuations, and thus the plurality of data sources 111 may store market trends, global interest rates in different currencies, GDP growth, consumer influences, interest rates, exchange rates, raw materials, commodity pricing, labor costs, different operating costs, etc. For patient monitoring data, the plurality of data sources 111 may store patient physical parameters such as blood pressure, oxygen saturation, heart rate, respiratory rate, medication, potential side effects, underlying conditions, medical history, etc. In another discipline, for example energy management, the plurality of data sources 111 may store types and sizes of local industries, historical usage, weather information, weather forecasts, demographic changes and shifts, income, GDP, balance of trade, interest rates, forced outage rates, plant availability, renewable resource integration, infrastructure, labor rates, etc. The above-provided industries and data are exemplary, and other types of data for the same or other industries may be stored in the plurality of data sources without departing from the scope of this disclosure.

To view data objects representing a cohort of patients, for example, using the 3D data visualization platform, a request may be entered by a user (e.g., an economist, researcher, or clinician or other health professional) via client device 122. The request may include a request to generate data objects of a plurality of specified subjects of interest, such as patients. The request may further include the types of data that are to be represented by each data object. For example, if the subjects of interest include a cohort of cancer patients, the types of data may include gene sequence data, gene expression data, diagnostic imaging data, lifestyle data, treatment data, and outcome data. As another example, if the subjects of interest include a cohort of patients that underwent preterm labor, the types of data may include lifestyle data, symptoms, metabolite data, cortisol/lipid data, hormone data, cytokine data, placenta data, clinical pathology data, and other relevant medical and personal data.

In response to the request, the integration server 103 may obtain and integrate relevant data. The relevant data may include some or all of the available data from each type of data for each specified subject of interest. For example, all available gene sequence data for each specified subject or condition of interest may be obtained. The relevant data may be obtained from the client device 122, the plurality of data sources 111, and/or other data sources. In some examples, the integration server 103 may include a data integration specification that supports comprehensive declarative queries over the data sources through the use of a data integration schema. Such queries may be parsed into one or more query segments appropriate for a specific data source. Specifically, the comprehensive data integration specification may enable a user to pose cohesive queries over siloed data sources in a unified analysis environment. The query may be mapped to the data integration schema and may include configurations for each of the data sources to enable aggregation and processing of the disparate data. The data integration schema may include data source-specific schema each comprising a description of an individual data source with a supported format and methods to translate data extracted from the individual data sources into a representation backed by the data integration schema in the comprehensive data integration specification.

Once the data has been obtained and integrated, the data (now forming the plurality of sets of related datasets) may be entered into ML/clustering module 104. The output of the ML/clustering module 104 may be applied to the 3D positioning module 106 in order to determine 3D positioning coordinates for each data object. The plurality of sets of related datasets may be entered into the summary metric calculating module 108, which may calculate a summary metric for each dataset. Each summary metric may be used (e.g., by the 3D data visualization platform 102) to generate a respective axis object. The plurality of sets of related datasets may also be entered into the data track module 110, which may generate a track object and any associated decorations for each dataset. The data objects may be displayed on client device 122 (e.g., via 3D browser 124). The 3D positioning coordinates may be used to position the data objects in the 3D display space, as described in more detail below.

Figure 2:
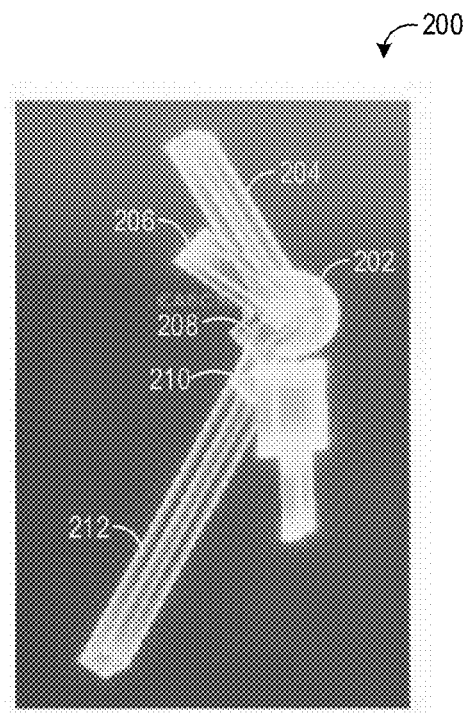
FIGS. 2-14 show example 3D data objects that may be generated by the 3D visualization system and displayed via the 3D browser of FIG. 1.

FIG. 2 shows an example of a data object 200 that may be generated by a 3D visualization platform, such as platform 102, in order to represent a set of related datasets. Data object 200 may be displayed on a display of a suitable computing device that is configured to execute a 3D browser, such as 3D browser 124 executing on computing device 122. Data object 200 may include a hub object 202. Hub object 202 may be a three-dimensional graphical representation of an individual subject of interest (such as a patient, a cell, or a stock). In the illustrated example, hub object 202 is a 3D graphical representation of a patient, and as such hub object 202 has a visual appearance resembling a person, though hub object 202 may take on other visual appearances without departing from the scope of this disclosure.

Figure 3:
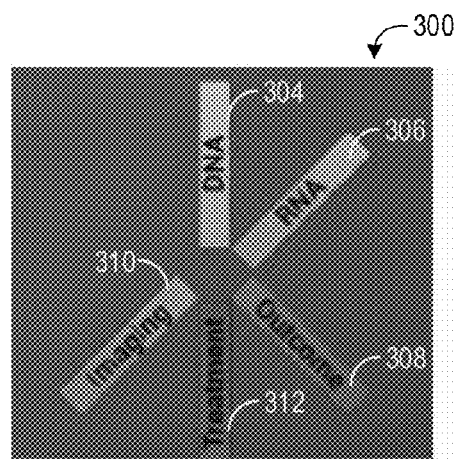

Data object 200 further includes a plurality of axis objects. Each axis object includes a graphical representation of a summary metric for a corresponding dataset of the set of related datasets. A summary metric may be a value that represents an aspect of the dataset represented by that summary metric/axis object, and will be described in more detail below. In FIG. 2, data object 200 includes five axis objects, a first axis object 204, a second axis object 206, a third axis object 208, a fourth axis object 210, and a fifth axis object 212. Each axis object may have a different color(s), hue(s) or shape(s) assigned to the type of data that is represented by that axis object. For example, a data legend 300 is shown in FIG. 3, illustrating the types/categories of data represented by each axis object of FIG. 2. The first axis object 204 is yellow, which as shown by first indicator 304 of data legend 300, is indicated as being representative of data related to DNA of the patient (e.g., gene sequencing data). Second indicator 306 of data legend 300 indicates that second axis object 206 represents data related to RNA of the patient (e.g., gene expression data), third indicator 308 of data legend 300 illustrates that third axis object 208 represents data related to patient outcomes, fourth indicator 310 illustrates that fourth axis object 210 represents data related to imaging (e.g., diagnostic imaging findings for the patient), and fifth indicator 312 illustrates that fifth axis object 212 represents data related to treatment (e.g., amount and/or types of treatment administered to the patient, clinical trial metadata for treatments administered as part of a clinical trial, etc.).

Returning to FIG. 2, each axis object projects outward in three dimensions from hub 202, in a starburst formation. In doing so, each axis object may be visualized without obstructing visualization of other axis objects. Each axis object may have the same shape (e.g., rectangular prisms) but may have a different length that corresponds to the summary metric that was calculated for that dataset for the subject of interest. In other aspects, different shapes may be used which may or may not provide additional information regarding the respective summary metric. As will be explained in more detail below with respect to FIGS. 9-14, adjusting the length of an axis object based on the summary metric for that axis object may allow for easy comparison of summary metrics for the same data category among multiple data objects.

For example, second axis object 206 may have a length that is based on the summary metric for the RNA-related dataset for the patient represented by data object 200. The summary metric for second axis object 206 may be determined using dimensionality reduction techniques, such as principal component analysis (PCA) or Uniform Manifold Approximation and Projection (UMAP). For example, the summary metric for second object 206 may be a principal component derived from a gene expression data for a cell or tumor of the patient, for example. In some examples, a summary metric may be a representation of a clustering distance metric for the patient's similarity to other patients as determined by a machine learning/clustering algorithm, which is explained in more detail below. In still further examples, the summary metric may be calculated using other techniques, such as constrained spherical deconvolution (CSD).

As explained above, each axis object may represent a summary metric for a corresponding dataset of the set of related datasets. Each axis object may be selected/expanded to show the underlying data of that dataset, to form what are referred to herein as data tracks represented by track objects. Each track object may be a longitudinal object representing a particular dimension of data related to an individual data point/object (which in the example of FIG. 2 would include the patient), such as a set of genomic variations or a timeline of clinical events for a patient, a set of gene expression measures for a cell, or a set of historical prices for a stock.

Figure 4:
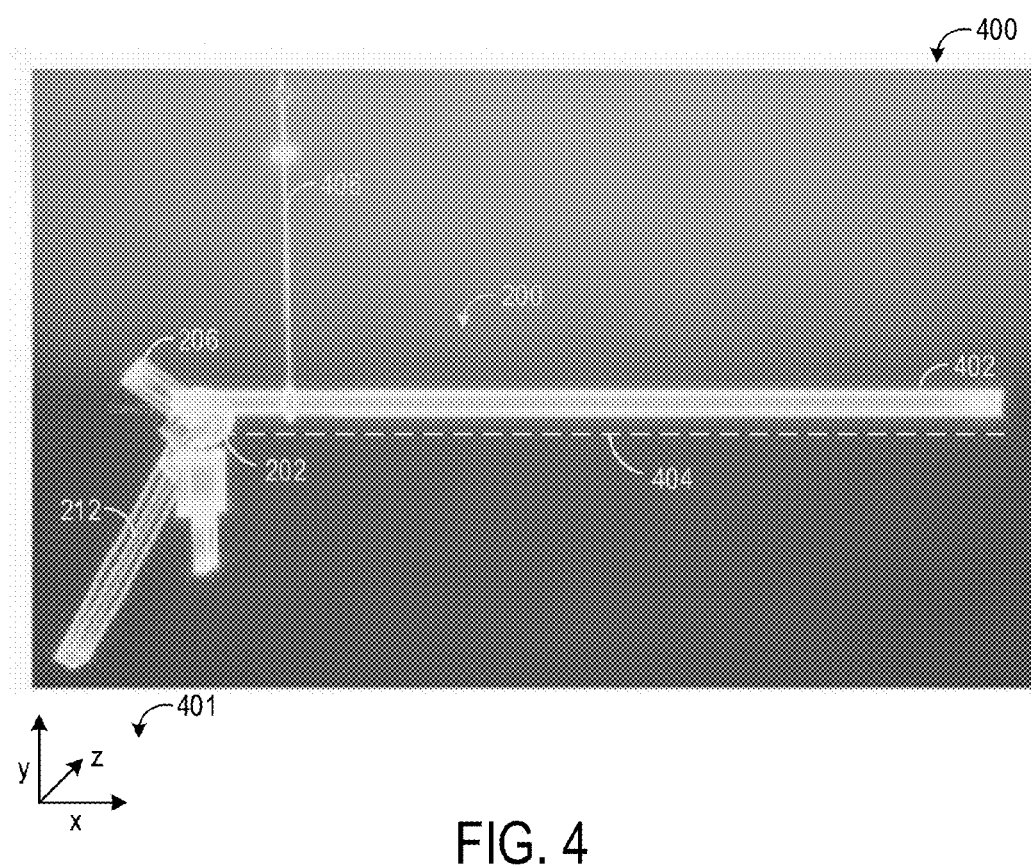

FIG. 4 shows an expanded view 400 of data object 200 where a first track object 402 corresponding to first axis object 202 is displayed. FIG. 4 includes a reference axis 401. A track object may be displayed in response to user input requesting to view the data track, such as a user input to an axis object (e.g., selection of an axis object may cause the corresponding track object to be displayed). Each track object may be displayed along a first axis. For example, first track object 402 may extend outward from hub object 202 in a first direction along axis 404 of FIG. 4. Axis 404 may be parallel to the x axis of reference axis 401. The axis objects may extend outward from hub object 202 in one or more other directions that are different from first direction, such that the axis objects are substantially displayed on one side of hub object 202 and the track objects (when displayed) are displayed on another, opposite side of hub object 202.

In the example shown in FIG. 4, a single data point 406 from the dataset represented by first track object 402 is shown. The data point 406 may be a mutation within the patient's genome, in a tumor or other specific tissue of the patient, in a specific gene, and/or other genomic dataset. The data point 406 may be displayed in response to user input, or the data point 406 may be displayed automatically. Further, while only a single data point is shown, multiple data points may be displayed, as will be described in more detail below.

Thus, a data object may include a hub object, one or more axis objects, and one or more track objects. The hub object may represent a patient, a stock, an industry, a company, a city, a cell, or another entity and the one or more axis objects and one or more track objects may represent aspects of respective datasets of a set of related datasets, where the set of related datasets are related to each other due to being associated with the entity represented by the hub object. For example, when the hub object represents a patient, each dataset of the set of related datasets may include data specific to the patient, such as patient genomic information, patient transcriptome information, patient imaging information, patient treatment information, metabolite information, test results, etc. In this example, when the hub object represents a patient, each axis object may represent a summary of a respective dataset, such as a summary of the patient genomic information, and each track object may represent more detailed information of a respective dataset, such as specific mutations within the patient genomic information. The hub and axis objects may be visually displayed as a starburst formation, as described above and shown in FIGS. 2-4, and a legend including color coding and description of each dimension of data (e.g., each dataset, and thus each axis object and/or track object) may be displayed along with the data object. When requested, one or more track objects may be displayed, which may include color-coded longitudinal objects that extend outward from the hub object.

However, various alterations to the basic state of these objects may be applied, such as changes in size, the coloration, intensity, or the texture applied to the objects, to indicate additional information about the object or its relationship to other data objects. Further, objects may use representations other than polygonal representations, such as representations based on voxel technology.

The hub, axis, and track objects may additionally be supplemented by other graphical objects or displays ("decorations") to indicate information about their state, including but not limited to data points, in the manner of bars on a bar graph; marks on data point bar objects; event objects; changes in the textures or coloration applied to a given object; displays of two-dimensional graphical elements; links to information from external sources, such as a web page, displayed on a web browser or other visualization technology linked to or embedded within the 3D viewing environment; representations of "edges" between hubs, tracks, or decorations to indicate relationships between those data points (e.g., an edge between a data point representing a biopsy and a track representing genomic information derived from that biopsy).

Data track objects are generally, but not necessarily, associated with a particular axis object; in such a case, the track object represents some or all of the underlying data that the axis object summarizes. For example, a track object linked to a mutation burden axis object may represent some or all of the genomic mutations that were used to calculate the summary metric that the mutation burden axis object represents. The track object may visually represent the detailed data via a suitable mechanism, though principally through the decoration types described above; these decorations are attached to the track and may themselves have additional decorations with varying levels of interactivity attached to them. By default, the track objects may be arranged as coming off the nominal "back" of their associated hub object; however, there are a number of alternative arrangements that may be utilized to emphasize relationships between hubs, axis objects, or track objects.

Figure 5:
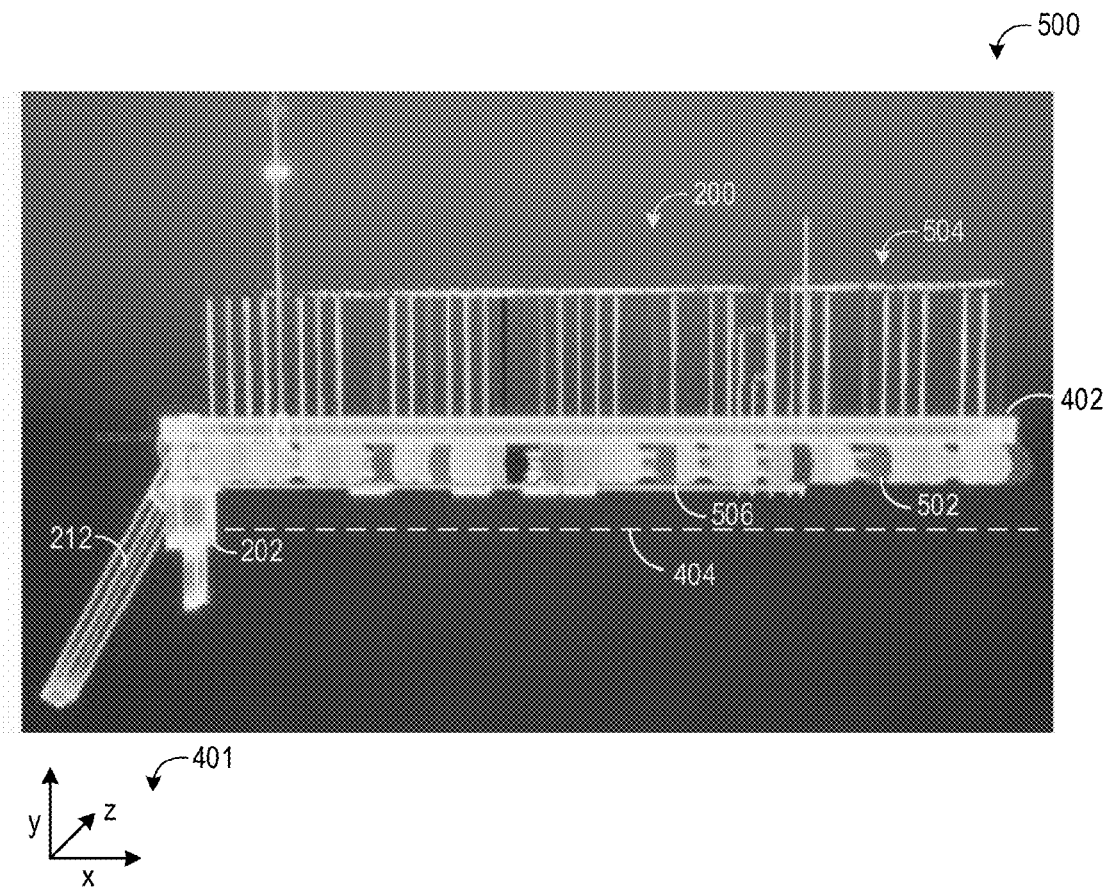

FIGS. 5-8 show examples of data objects with more than one track object being displayed. FIG. 5 shows a second expanded view 500 of data object 200 where additional track objects are shown. In addition to first track object 402, a second track object 502 and a third track object 506 are displayed. Second track object 502 may correspond to second axis object 206 and may include RNA-related data of the patient (e.g., gene expression data for a subset of genes of the patient in a specific tissue, such as a tumor). Third track object 506 may correspond to fourth axis object 210 and may include data related to diagnostic imaging information of the patient (e.g., CT, MRI, and/or ultrasound images of the patient, findings stemming from diagnostic imaging, pathology images, etc.). Each of the first track object 402, second track object 502, and third track object 506 may include a longitudinal object (e.g., a cylinder, a rectangular prism, etc.) having a longitudinal axis that is parallel to axis 404, and each may extend along axis 404 from hub object 202.

Further, additional information 504 about the underlying data for the second track object 502 is shown in FIG. 5 in the form of bars extending up from the second track object 502, where each bar corresponds to a data point of the dataset represented by second track object 502 (e.g., relative gene expression for each of a plurality of genes). Further, the additional information 504 includes marks on the data point bar objects (e.g., gene names).

Figure 6:
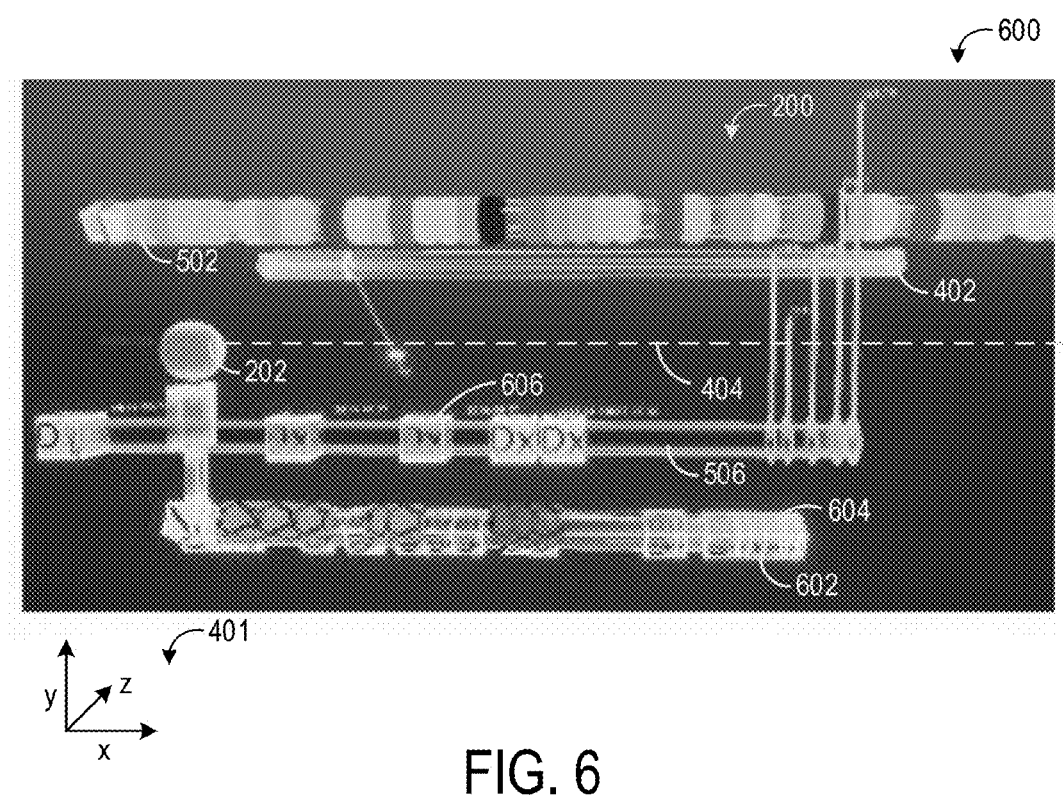

FIG. 6 shows a third expanded view 600 of data object 200 where additional track objects are shown. In addition to first track object 402, second track object 502, and third track object 506, a fourth track object 602 and a fifth track object 604 are displayed. Fourth track object 602 may correspond to third axis object 208 and may represent data related to outcomes of the patient (e.g., tumor growth or regression, diagnostic imaging findings, clinician records regarding patient state, hospital admissions and/or discharges). Fifth track object 604 may correspond to fifth axis object 212 and may represent data related to treatments administered to the patient (e.g., amounts and/or types of treatments, such as chemotherapy, radiation treatment, prescribed drugs, etc., clinical trial metadata, and so forth). Each of the fourth track object 602 and fifth track object 604 may include a longitudinal object (e.g., a cylinder, a rectangular prism, etc.) having a longitudinal axis that is parallel to axis 404, and each may extend along axis 404 from hub object 202.

The track objects shown in FIG. 6 may be arranged in a cylinder-like fashion around hub object 202, and may be rotatable around axis 404 to enable each track object to be viewed by a user. For example, in the third expanded view 600 of FIG. 6, the track objects have been moved relative to the positions shown in the second expanded view 500 of FIG. 5, which may allow third track object 506 to be visualized. Third track object 506 may include decorations (herein in the form of cubes labeled "Dx" for diagnostic) that indicate specific diagnostic imaging sessions for the patient. User input selecting a specific Dx cube (e.g., cube 606) may cause one or more images taken during that diagnostic imaging session to be displayed. Fourth track object 602 and fifth track object 604 may include similar decorations (e.g., cubes or other shapes positioned around a central cylinder or rectangular prism) indicating specific patient outcomes and treatments, respectively, that when selected may cause patient records or other information indicative of the outcome or treatment to be displayed.

Figure 7:
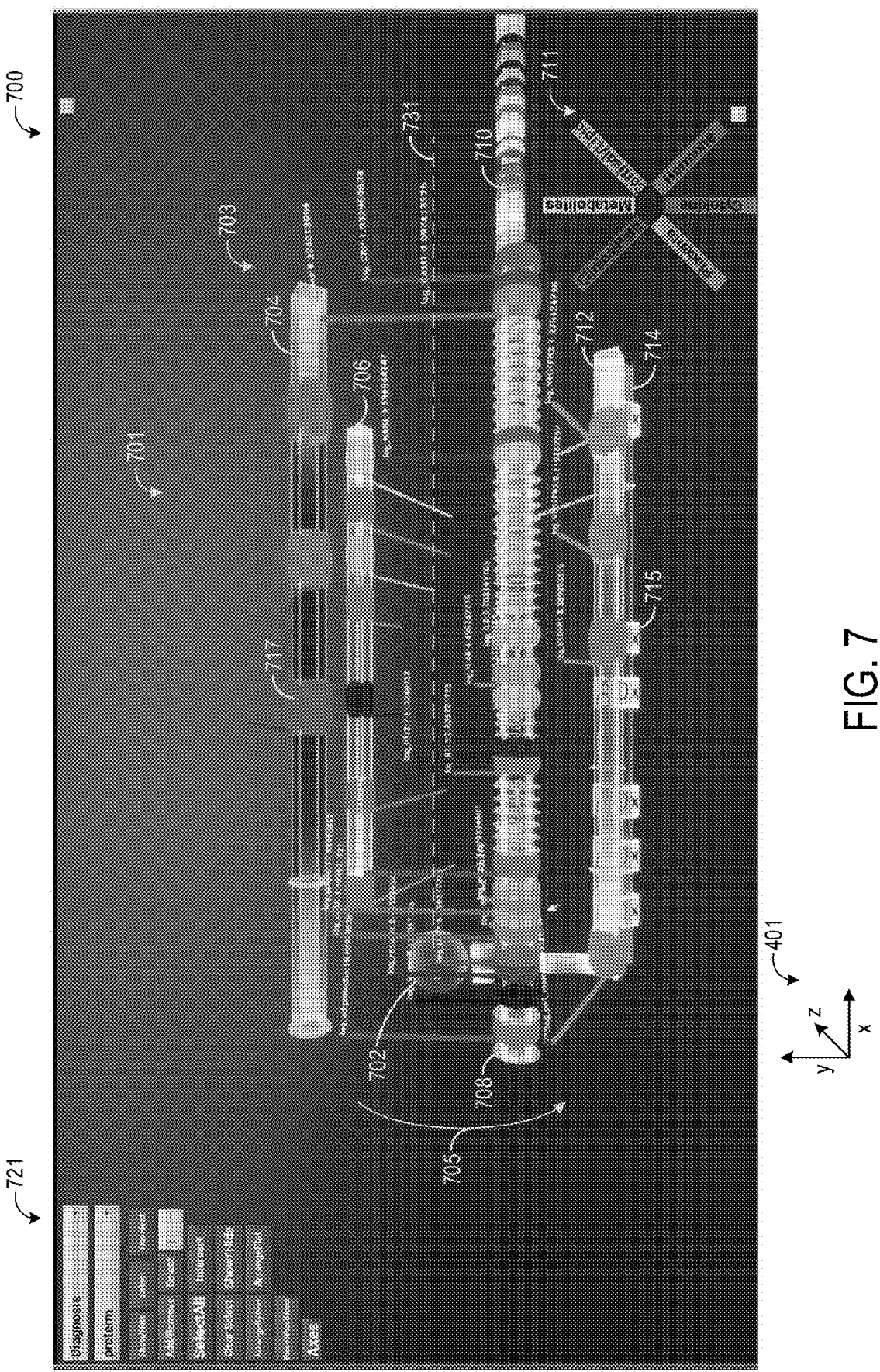
Figure 8:
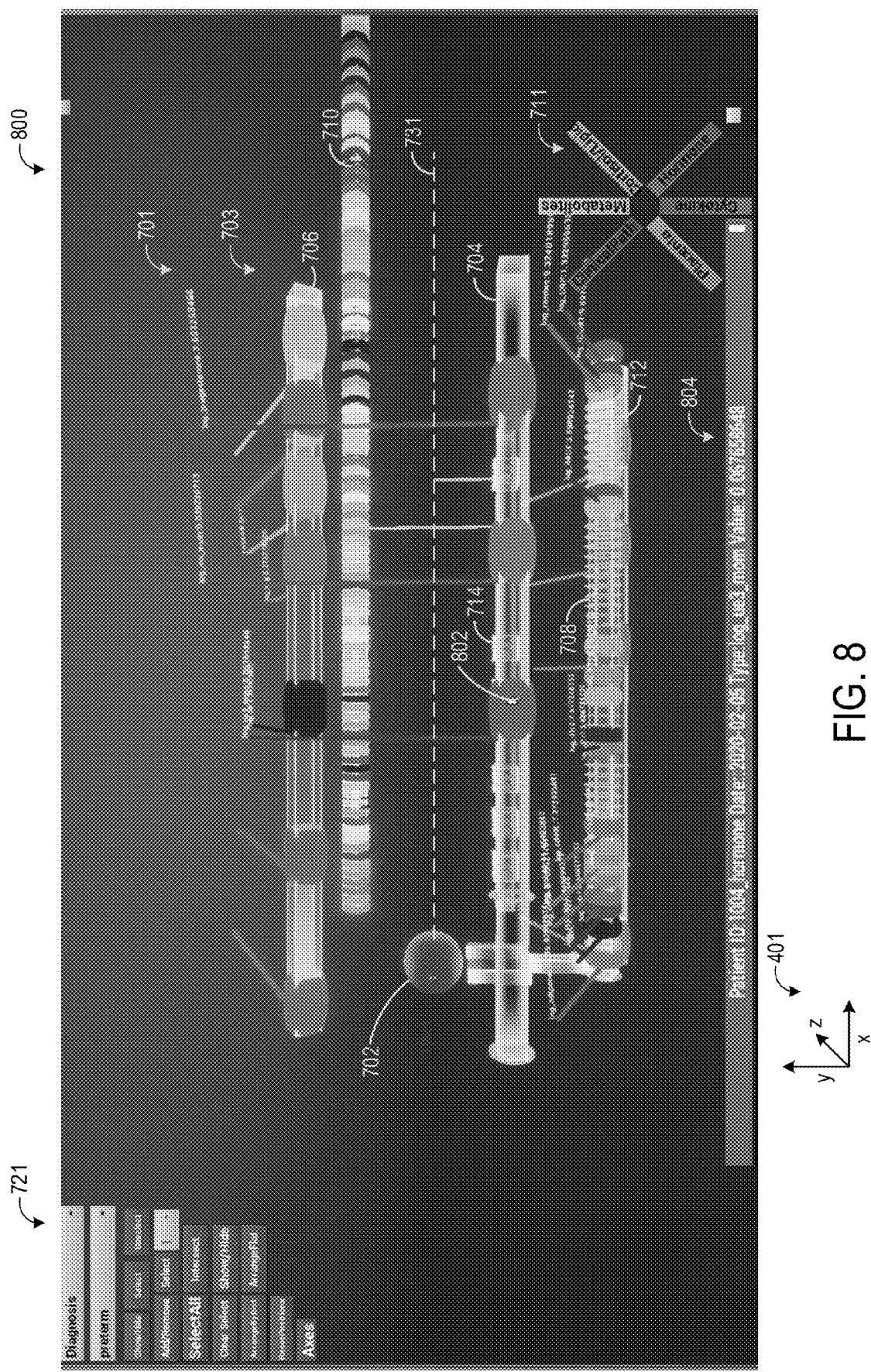

FIGS. 7 and 8 show expanded views of another data object displayed on a display device, such as a display of computing device 122 of FIG. 1, according to embodiments of the present disclosure. FIG. 7 shows a first expanded view 700 of a data object 701 and FIG. 8 shows a second expanded view 800 of the data object 701. Data object 701 includes a hub object 702 and a plurality of track objects 703 arranged in a cylinder-like fashion around the hub object 702. The data object 701 is displayed as part of a graphical user interface that includes a data legend 711 and a plurality of user interface buttons 721. Similar to data object 200, data object 701 may represent a patient and the plurality of track objects 703 may represent datasets related to the patient.

The plurality of track objects 703 includes a first track object 704 representing a first dataset that includes hormone information of the patient (e.g., measured hormone levels for a plurality of hormones), a second track object 706 representing a second dataset that includes cortisol/lipid information of the patient (e.g., measured cortisol and lipid levels), a third track object 708 representing a third dataset that includes cytokine information of the patient (e.g., measured cytokine levels), a fourth track object 710 representing a fourth dataset that includes metabolite information of the patient (e.g., measured levels of various metabolites), a fifth track object 712 representing a fifth dataset that includes placenta information of the patient, and a sixth track object 714 representing a sixth dataset that includes clinical pathology information of the patient.

The plurality of track objects 703 extend along a central axis 731 and are arranged in a circular/cylinder fashion around the central axis 731. In response to a user request to move the plurality of track objects 703, the plurality of track objects 703 may rotate around the central axis 731 (e.g., in a direction shown by arrow 705), changing the position of each track object while maintaining relative positional relationships among the plurality of track objects. For example, in the first expanded view 700, third track object 708 is positioned intermediate first track object 704 and fifth track object 712, while blocking fourth track object 710 from view (at least partially along fourth track object 710). In the second expanded view 800, the track objects have been rotated around the central axis 731, such that first track object 704 is now in the position previously occupied by third track object 708, fourth track object 710 has been moved upward and is no longer blocked by another track object, etc. However, third track object 708 is still positioned intermediate first track object 704 and fifth track object 712.

As appreciated by FIGS. 7 and 8, select data points from each dataset may be highlighted with different decorations on each track object. For example, diagnostic pathology results may be represented by white cubes on sixth track object 714, such as white cube 715, measured hormone levels may be represented by red cylinders on first track object 704 (including bars extending upward, with text showing which hormones were measured and the measured levels), etc., such as red cylinder 717. To view a data point in more detail, a user may select a decoration on a track object (e.g., by hovering over the decoration), which may cause additional information about that data point to be displayed. For example, as shown by cursor 802 of FIG. 8, a user has hovered over a decoration representing a data point on first track object 704, causing additional information related to the selected data point to be displayed as a banner 804. As shown, banner 804 indicates that the patient's hormone level for unconjugated estriol was measured on Feb. 5, 2020, and had a value of 0.06765. In this way, the underlying data used to generate the data object 701 may be viewed directly within the data visualization environment (e.g., directly while viewing data object 701) without the user having to navigate to the actual data source from which the data was obtained. In doing so, user efficiency in viewing desired data may be increased and the user experience and ability to model, analyze, or make conclusions regarding the data may be improved.

Thus, FIGS. 2-8 show examples of individual data objects as viewed via a 3D browser and generated by a 3D visualization platform. The data objects described herein are ideally suited for visualizing multi-modal data associated with a given hub object simultaneously, a key for understanding complex relationships among different types of data related to the same subject of interest. For example, visualizing changes in gene expression and biomarker levels in relation to genomic background and treatment events in a patient evaluation application would typically require consulting multiple different visualizations in a conventional 2D or 3D representation; in contrast, the 3D viewing environment and data objects described herein naturally allow for these multi-modal data types to be simultaneously visualized in relation to a given hub object, facilitating recognition of patterns and relations between the different data modalities.

In this way, a data object may be represented in its digital entirety, and can be subjected to more modifications that will be reflected immediately and dynamically. This enables the data object to be compared and manipulated easily for any empirical observations and causal effects that could be used by the clinicians.

In addition, multiple data objects may be viewed at once, which may allow comparison among different data objects (e.g., representing different subjects of interest). At the most basic level, the 3D viewing environment may distribute data objects in 3D space in a potentially meaningful way to indicate relationships between those data objects. Though such distribution may be random, in general such distributions may utilize distances to indicate similarity, based on one or more data points, between the subjects of interest represented by the data objects. These may be stringently divided among axes (e.g., position of a data object along the x axis may indicate similarity along a metric or data type orthogonal to those on the y or z axis), may be the result of an embedding of a more complex data set into a three dimensional space as a result of an artificial intelligence algorithm or dimensionality reduction algorithm, or may be a combination of the two (e.g., a 2D embedding from dimensionality reduction of genomics along the x and y axis and a distribution based on the value of a clinical covariant on the z axis for patient data). This distribution may be updated during a session based on user input (e.g., repositioning the data objects based on a new run of a machine learning algorithm on the same input data but with altered parameters) or automatically (e.g., clustering patients who are of more/less concern in the space based on real-time updates from a decision support algorithm in a patient monitoring application). Hub objects may be decorated or otherwise visually altered to indicate membership within a given cluster as determined by a user and/or algorithm, and these alterations may be updated manually or automatically as described for 3D positioning.

FIGS. 9-14 show examples of multiple data objects displayed on a single 3D visualization display screen/user interface. Each data object of the plurality of data objects 902 may represent a respective subject of interest, such as a respective patient. For example, a first data object 904 may represent a first patient, a second data object 906 may represent a second patient, etc. Each data object may include a hub object and a plurality of axis objects, similar to the data object 200 described above.

Figure 9:
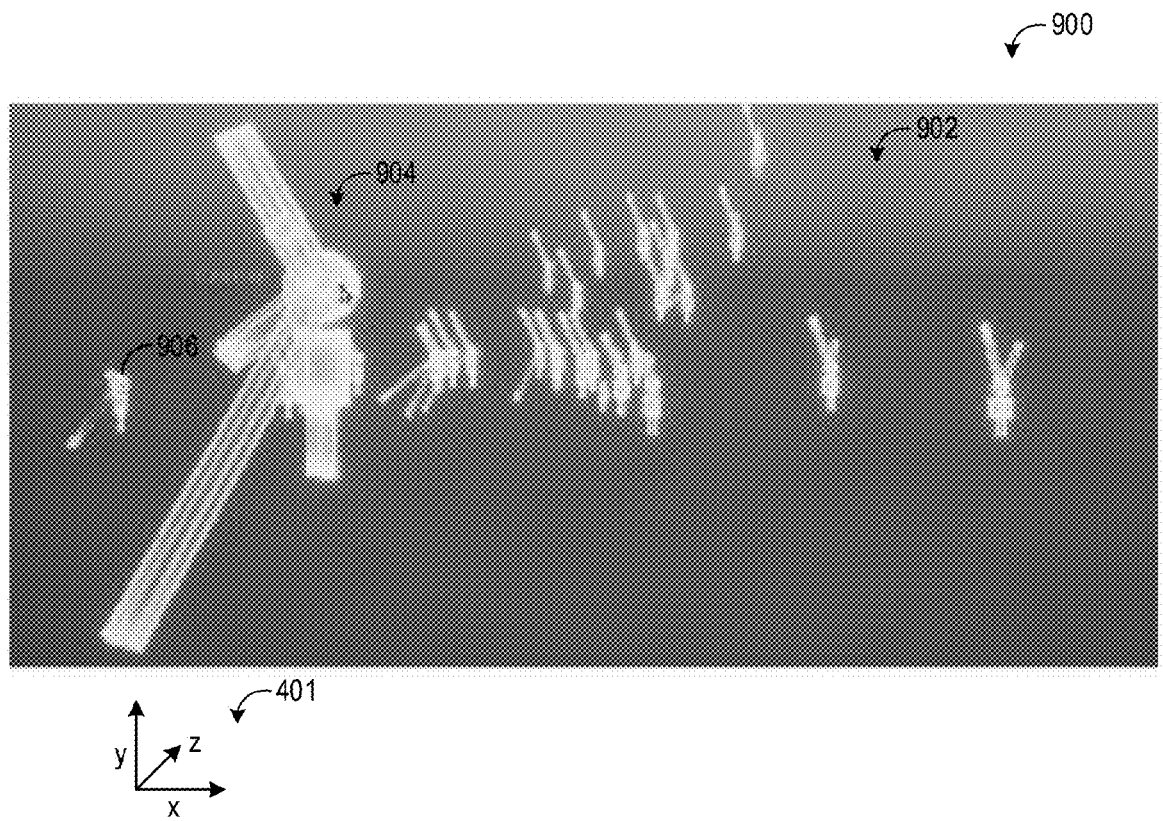

FIG. 9 shows a first multi-object view 900 that may be displayed on a display device, such as a display of computing device 122 of FIG. 1. First multi-object view 900 includes a plurality of data objects 902. In the example shown in FIG. 9, each data object may include the same axis objects, where data is available to be represented by such axis objects. For example, first data object 904 may include five axis objects (one of which has a summary metric that is so small that it is not visible in FIG. 9) each representing a dataset of a set of related datasets associated with the first patient (e.g., DNA, RNA, outcomes, treatments, and imaging). Second data object 906 may likewise include five axis objects each representing a dataset of a set of related datasets associated with the second patient (e.g., DNA, RNA, outcomes, treatments, and imaging). However, due to differing summary metrics for the different datasets of the different patients, the axis objects for the first data object 904 may have different lengths than the axis objects for the second data object 906 (e.g., the pink axis object for the first data object 904 may be relatively long and the blue axis object is too small to be visualized, while the blue axis object for the second data object 906 may be relatively long and the pink axis object is too small to be visualized).

As explained above, the plurality of data objects 902 may be positioned in 3D space based on the output of a clustering algorithm or other suitable artificial intelligence algorithm or dimensionality reduction algorithm. While each data object may occupy a different position in 3D space, each data object may be oriented similarly, such that the hub objects all extend vertically (e.g., parallel to they axis of reference axis 401) in the same manner and the axis objects all extend from respective hub objects at the same direction and angle. Because the data objects are positioned in the 3D space, the data objects may be scaled in size to represent positional depth (e.g., data objects positioned closer to a viewing plane may be larger than data objects positioned further from the viewing plane). For example, as shown in FIG. 9, the plurality of data objects 902 are distributed at different positions along each of the x, y, and z axes of reference axis 401, with the different position of each data object on the z axis indicated by the relative size of the data object.

By positioning each data object of a plurality of data objects in 3D space based on similarities and differences between various aspects of the datasets represented by the data objects, a user may be able to gain insight into the data objects and the relationships between them without having to view and compare each of the datasets represented by the data objects. Once the user has identified two or more data objects of interest, the user may select those data objects for further analysis, viewing one or more data tracks of each selected data object. To accomplish this, the 3D viewing environment described herein provides interfaces for data manipulation (e.g. a "handle" object attached to a hub object for expanding a clustering surface for finding nearest-neighbors to the selected hub object based on a given three-dimensional embedding) to enable sophisticated data manipulation via intuitive controls.

Figure 10:
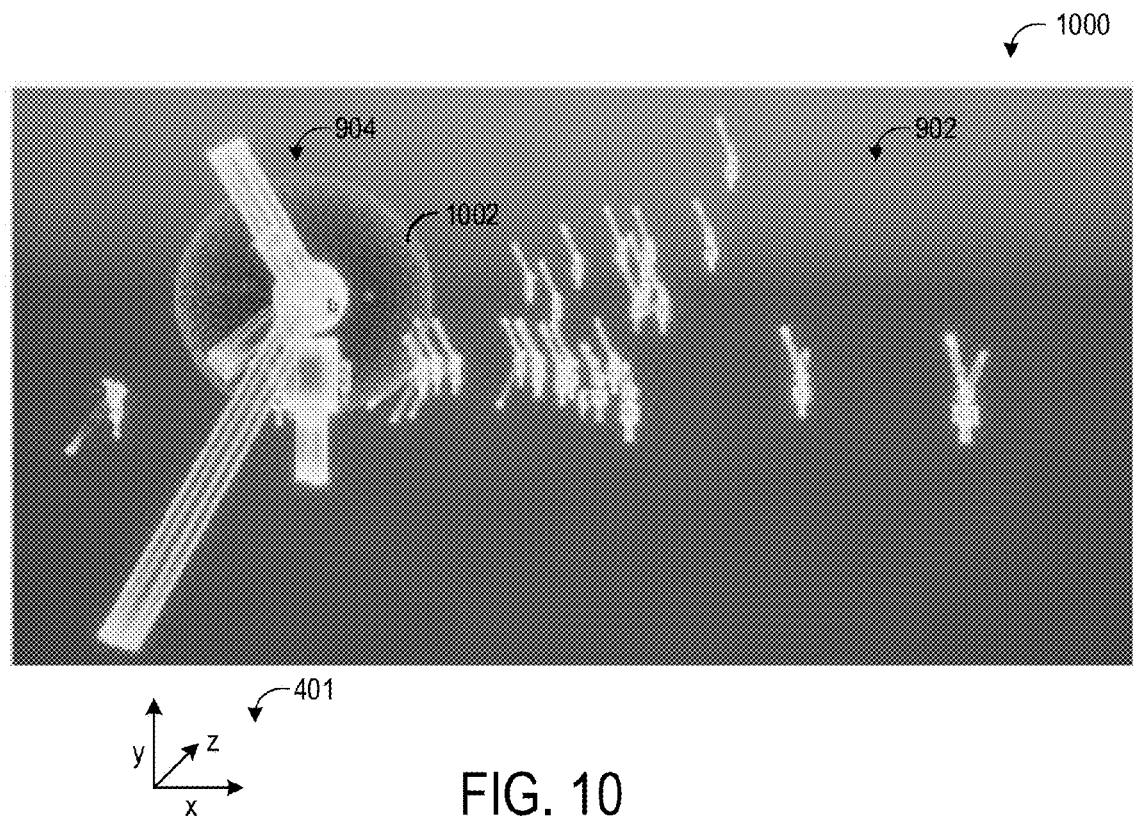

FIG. 10 shows a second multi-object view 1000 that may be displayed on a display device, such as a display of computing device 122 of FIG. 1. Second multi-object view 1000 includes the plurality of data objects 902 shown in first multi-object view 900. Further, a handle or other object on first data object 904 has been selected and expanded and/or dragged by a user to generate a selection sphere 1002. Selection sphere 1002 may visually indicate that the data objects contained within the selection sphere will be selected for further analysis, allowing the user to form and manipulate cohorts. While selection sphere 1002 is spherical in order to include all data objects within a threshold distance of the first data object 904 regardless of whether those data objects are to the right, to the left, in front of, behind of, above, or underneath the first data object 904, other shapes are possible. Further, a user may select desired data objects for further analysis via other mechanisms, such as by selecting desired data objects (e.g., via mouse clicks or touch inputs to those data objects). Further still, the user may enter different input(s) to select data objects for analysis, such as by selecting desired summary metrics, or ranking specific characteristics. In some aspects, different inputs may alter the shape of the selection sphere as data objects may be arranged according to specific parameters. For example, the input(s) may include a request to group/view all data objects that include a specific data point, such as all data objects including cancer. An initial sphere could group all cancers by the types of cancer. Further inputs could include a request to group/view all data objects with a specific mutation or environmental exposure which could result in a rearrangement of the data objects indicating that a specific mutation or environmental exposure resulted in multiple types of cancer. In some aspects, cohorts may be created based on observation of the data objects. For example, the user may have noticed that all patients with a particular mutation and specific treatment protocol have a different response than patients without that mutation and thus, may input a request or manually group all patients with that mutation together, or may group all patients treated with that specific treatment protocol into a selection sphere for further analysis. Such groupings and rearrangements allows for visual understanding of the data presented and may lead to insights and understandings that would not be available through the review of each data set individually. In some aspects, the selection sphere may change in visual appearance (e.g., flatten on one side and/or elongate on another side) to capture the identified data objects.

Figure 11:
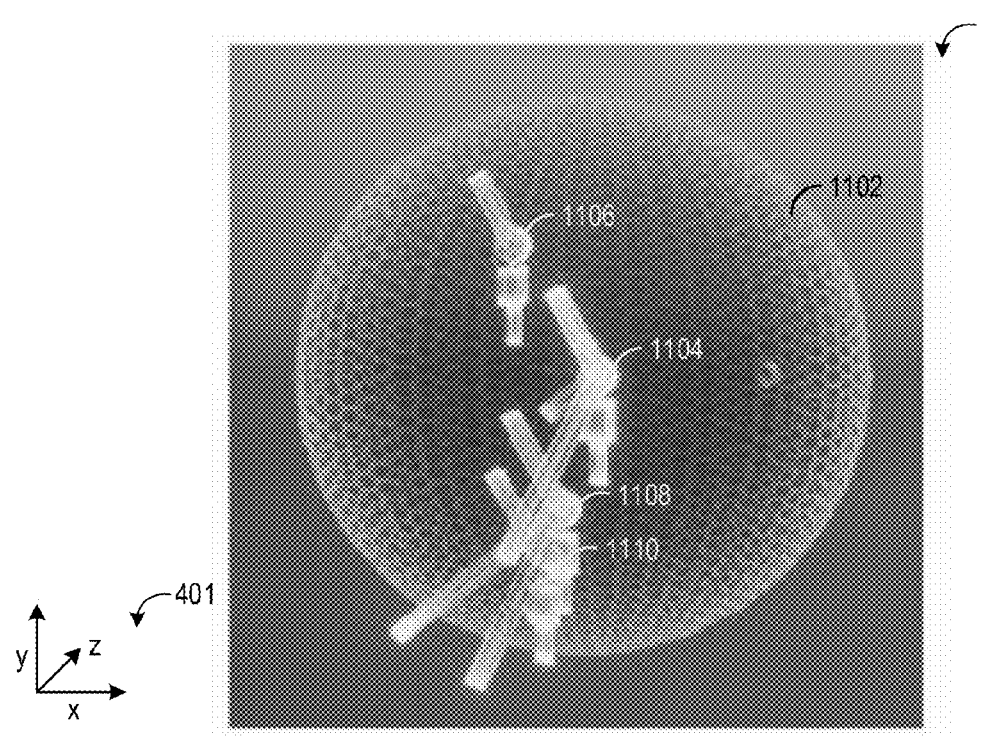

FIG. 11 shows a third multi-object view 1100 that may be displayed on a display device, such as a display of computing device 122 of FIG. 1. Third multi-object view 1100 includes a plurality of data objects, which may be the same as some of the data objects of the plurality of data objects 902 or may be different data objects. The data objects shown in FIG. 11 are all included in a selection sphere 1102. The data objects included in selection sphere 1102 include a first data object 1104 (which may be the data object having the handle that was initially selected by the user to generate the selection sphere 1102), a second data object 1106, a third data object 1108, and a fourth data object 1110.

Figure 12:
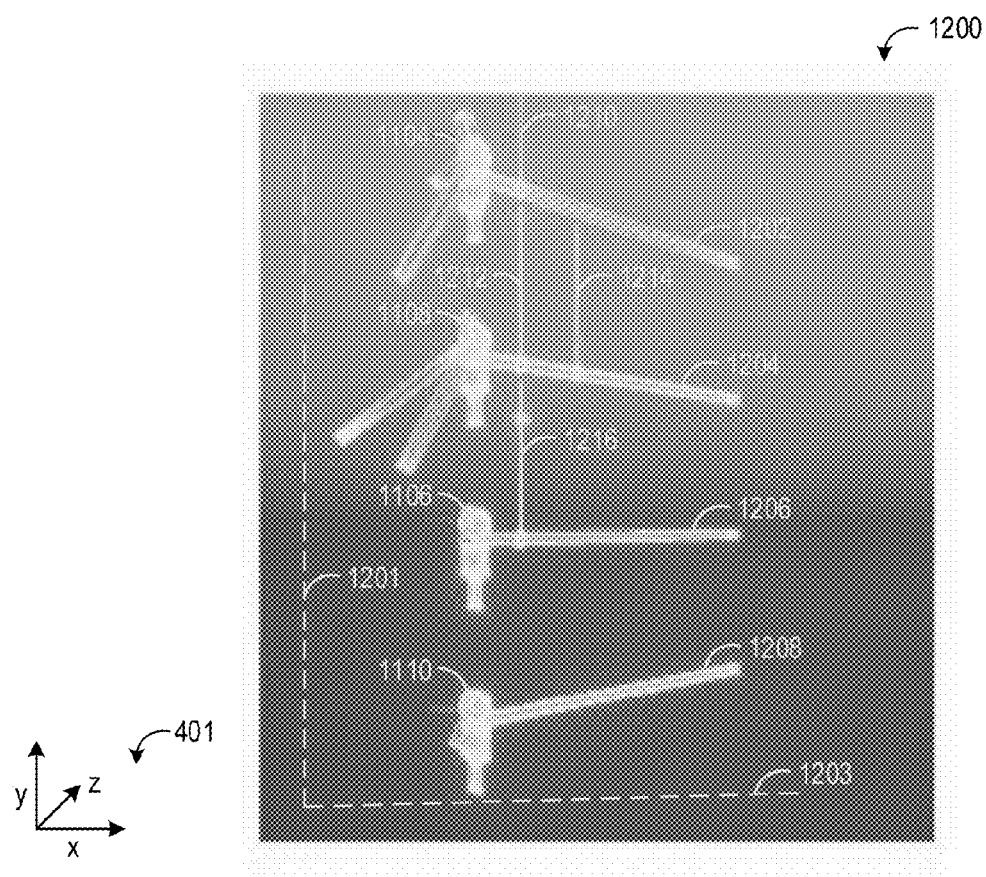

In response to a user input (e.g., the user releasing the handle that was moved to create the selection sphere), the data objects included within the selection sphere 1102 may be rearranged (e.g., aligned) to facilitate comparison of axis objects and/or track objects of the selected data objects. FIG. 12 shows a fourth multi-object view 1200 that may be displayed on a display device, such as a display of computing device 122 of FIG. 1. Fourth multi-object view 1200 includes the plurality of data objects illustrated in FIG. 11, aligned along a first axis 1201 (which is parallel to they axis of reference axis 401). In the example shown, the data objects are positioned with the first data object 1104 on top, followed by the third data object 1108, the second data object 1106, and then the fourth data object 1110. In this way, the data objects may be arranged in order of proximity to the first data object 1104, although other arrangements are possible without departing from the scope of this disclosure.

A track object of each data object is also displayed in fourth multi-object view 1200, with each track object extending along a second axis 1203 that is substantially perpendicular to the first axis 1201 (e.g., second axis 1203 is parallel to the x axis of reference axis 401). For example, the first data object 1104 includes a first track object 1202, the third data object 1108 includes a second track object 1204, the second data object 1106 includes a third track object 1206, and the fourth data object 1110 includes a fourth track object 1208. Each of the displayed track objects (e.g., first track object 1202, second track object 1204, third track object 1206, and fourth track object 1208) may be related/similar track objects. For example, each of the displayed track objects may be associated with related/similar axis objects for each data object, such as each track object representing a respective dataset that includes DNA information for each corresponding patient. In this way, DNA information for each patient represented by the selected data objects may be viewed simultaneously.

As an example, each patient represented by the selected data objects shown in FIG. 12 may currently have or previously had a related medical condition, such as each patient having a current and/or prior diagnosis of breast cancer. The DNA information represented for each patient may include a tested mutation burden for each patient. Select mutations may be shown with bars extending up from the corresponding track. For example, a first mutation is represented by bar 1210, extending up from first track 1202, indicating that the patient represented by the first data object exhibits this mutation in the tested tissue (e.g., tumor). This mutation may also be present (or at least a mutation in the same gene) in the patient represented by third data object 1108, as shown by bar 1212, which is aligned with bar 1210. The second track 1204 may include a second mutation, indicated by bar 1214. The patient represented by second data object 1106 may also exhibit the first mutation, as shown by bar 1216.

Figure 13:
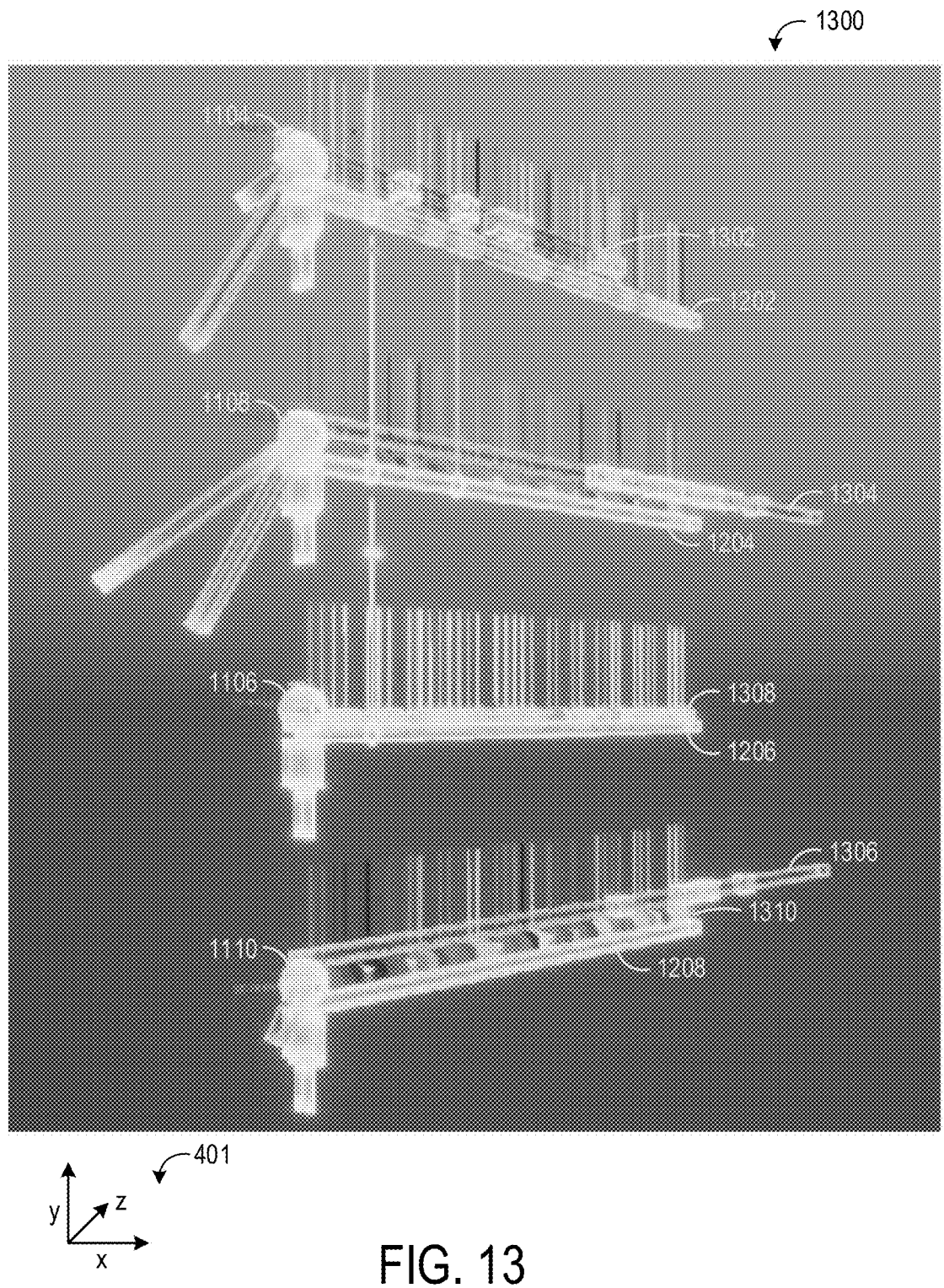

In FIG. 13, a fifth multi-object view 1300 is shown, where multiple track objects for each data object are shown. In addition to the track objects described above with respect to FIG. 12, track objects relating to diagnostic imaging may be displayed (e.g., track objects 1302, 1304, and 1306) as well track objects relating to RNA/gene expression (e.g., track objects 1308 and 1310).

Figure 14:
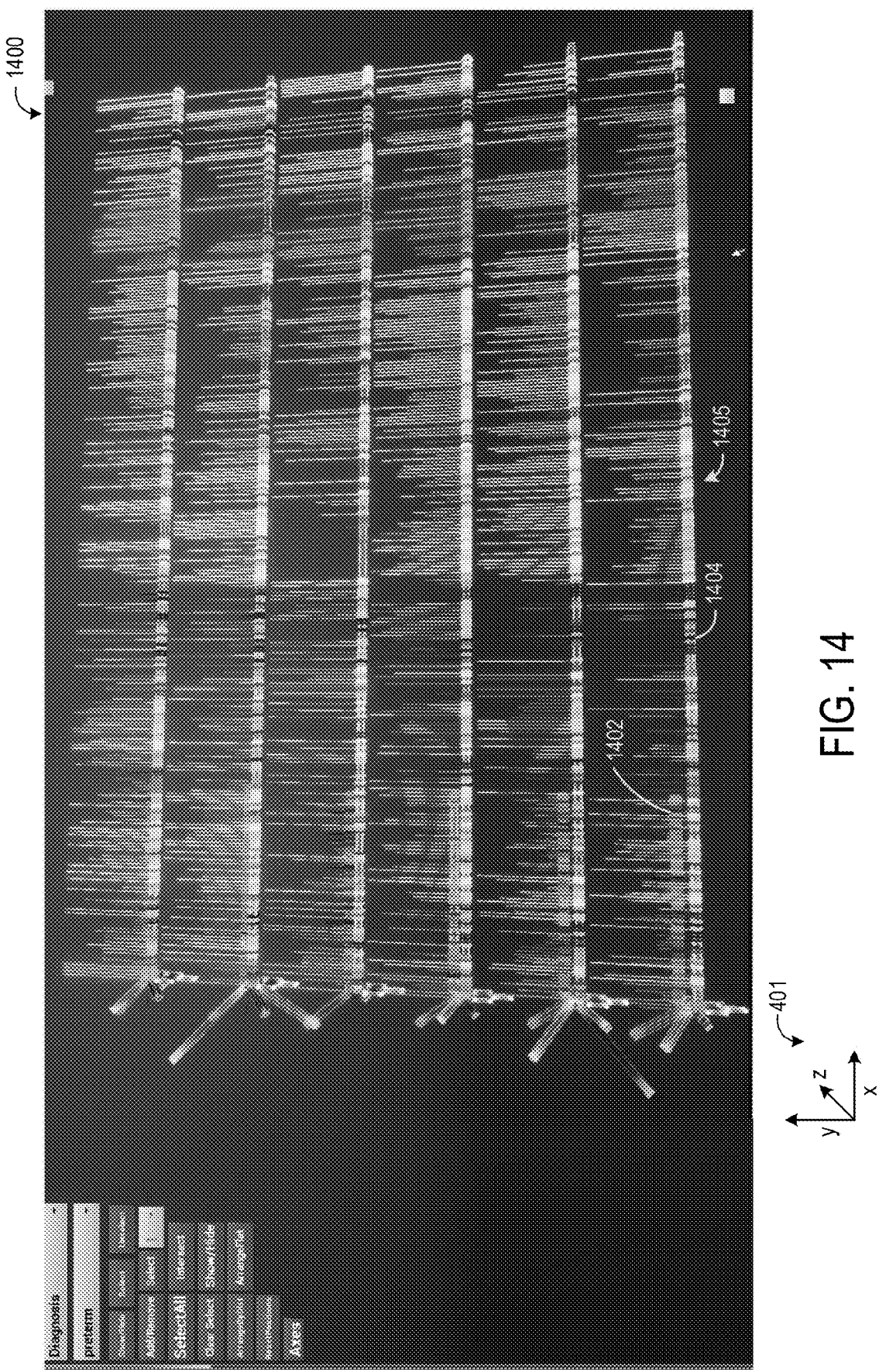

The data that is presented via the track objects shown herein may be organized in a consistent manner to allow quick visual comparison among different data objects. As explained above, the mutation burden data may be shown for each of a plurality of patients. The mutation burden data that is obtained for each patient may be organized such that any indicated mutations (and lack of mutations) that are common among two or more of the patients are positioned at the same place along each DNA track object. FIG. 14 shows another example of a multi-object view 1400 where patient data for a plurality of patients are shown via track objects, and where the data represented by each track object is organized and presented to highlight commonalities among patients as well as highlight areas of divergence among patients. In multi-object view 1400, six data objects are shown and two track objects for each data object are displayed, a first track object (such as track object 1402) showing cytokine data for each patient and a second track object (such as track object 1404) showing metabolite data for each patient. As appreciated from FIG. 14, the metabolite data may be color coded and arranged along the respective track objects in a consistent manner to allow metabolite levels for the same metabolites to be compared across the multiple patients. For example, metabolites of a first classification may be shown in yellow, while metabolites of a second classification may be shown in pink, metabolites of a third classification may be shown in blue, etc. The different classifications of the metabolites may be based on chemical structure, physiological effects, biomarker status, etc. The measured level of each metabolite may be indicated by the height of the bar for that metabolite. For example, the metabolites classified in yellow (such as section 1405) may exhibit relatively high levels in one patient (e.g., the fifth patient from the top) while those same metabolites may be lower in another patient (e.g., the bottom patient). Thus, the user may be able to create a model based on their observations, compare a patient to a model and update and refine the model. For example, as shown in FIG. 14, it may be determined that patients with metabolite levels below a threshold level have a different outcome or a different response to a treatment protocol than patients with metabolite levels above the threshold level, or patients with metabolite levels below a threshold level at a particular time point in a disease progression may have a different outcome or response. In other aspects, such a visual comparison may allow for additional insights including, but not limited to, the identification of secondary uses for treatments. For example, a particular treatment may not be effective for the primary condition, but by comparing the various datasets, it may be discovered that the treatment is effective in alleviating a secondary condition in patients with a particular genetic profile.

Thus, as illustrated in FIGS. 9-14 and explained herein, the distribution of the data objects may be based directly on or indirectly reflected by the state of the summary metrics, which are represented using the axis objects described above. These axis objects may be arranged in a "starburst" pattern at the nominal "front" of the hub object, though these may be otherwise oriented without departing from the scope of this disclosure. However, the "starburst" patterning, which results from placement of the axis objects in a ring at an approximately 60 degree angle inclining towards the nominal "front" of the hub object, has a number of distinct advantages for visualization in 3D space. Chiefly, the "starburst" pattern is effectively an orthographic representation when viewed from any 90-degree rotation about the hub object, such that the relative sizes of axis objects are retained as best as possible from any possible viewpoint of the hub object. The primary purpose of the axis object is to represent the state of a summary metric associated with a hub object in a way that it can be easily visually assessed in the context of both the axis objects and track objects attached to a given hub object and in the context of other axis objects and track objects of other hubs and their 3D position relative to a given data object. This allows users to rapidly and intuitively gain insight into the relationships between and underlying reasons for a given 3D relationship between hub objects; as a concrete example, if two hub objects placed close together in 3D space have similar axis objects related to mutation burden in a patient population, this may indicate that these hub objects are clustering together in whole or part because of this similarity in mutation burden.

These data representations allow multi-modal data to be evaluated quickly not only within a given subject of interest, but also in relation to multiple data modalities across multiple data objects. By visualizing axis objects and/or track objects in the context of 3D spatial relationships, the state of many variables across multiple data objects can be quickly ascertained and the contribution of these variables (if any) to, e.g., the clustering of high-risk systems within a systems monitoring application can be assessed rapidly and intuitively.

The data object hub objects, axis objects, and track objects are arranged in a hierarchical structure that reflects increasing level of detail as one proceeds down the hierarchy, leading to a natural flow of understanding of embedding/clustering to summary metrics to detailed information. As described above, this structure facilitates understanding and evaluating what information is driving the decisions arrived at by neural network algorithms by allowing all three levels of information to be simultaneously visualized. In contrast, a conventional 2D/3D plot of embedding of outputs of a neural network algorithm, for example, would need to be accompanied by a number of additional 2D/3D plots or tables to show the values of different levels of information.

The arrangement of hub objects in 3D space indicates high-level relationships among the data points/subjects associated with those data objects (e.g., patients), often as embedded by a machine learning, dimensionality reduction, or other clustering algorithm. These spatial indications of relationships may be augmented by decorations or other visual indications, such as of cluster membership.

Axis objects indicate the state of summary variables (also referred to herein as summary metrics) associated with hub objects, providing an intuitive visual representation of the state of each hub object in feature space informing 3D positioning. This level of representation may be particularly useful for enabling human understanding of the output of neural network-based artificial intelligence algorithms, as the embedding within a 3D space of the outputs of such an algorithm alone may not provide sufficient insight into the features driving the algorithm's outputs.

Track objects and their decorations provide insight into either the detailed features incorporated into an axis object and/or other detailed features of interest to users regarding a given data object. As with the axis objects themselves, this representation may be useful for understanding what inputs may be influencing the output of complex neural network algorithms. In addition, these representations may be useful for quickly assessing the state of one or more variables across many data objects utilizing proper decorations/visualizations; for example, the state of a gene expression panel in a breast cancer cohort may be rapidly assessed for patterns corresponding to clinically relevant types of disease via visualization using appropriate decorations in the style of a "heat map" on the corresponding track objects across many samples.

Data objects and their decorations may be subject to various animations and transformations to indicate relationships and data values to users and to enable optimized visual representations for both programmatically and user-specified applications. The non-static nature of the 3D viewing environment allows for the use of repositioning and animation of objects both to facilitate users (e.g., to show or hide the most relevant data for a given user's query) and to reflect important relationships among the data objects themselves (such as the repositioning of high-risk systems into a distinct position/cluster in real time based on a security monitoring algorithm in a computer security monitoring application).

Illustrative examples include but are not limited to: users may adjust the density of a display of gene expression values to accommodate their preferred visualization mode; a user may impose a new three-dimensional distribution of the data object hubs based on adjustment of parameters in a machine learning or dimensionality reduction algorithm; a user may filter the visual representation of hub objects and their associated axis/track objects and decorations so that only hub objects associated with a specific data value or set of data values (e.g., a specific mutation in a patient population) are visible or are clustered together. For example, data objects representing breast cancer patients may be distributed in 3D display space according to a clustering algorithm that may identify a particular mutation, such as a mutation within BRCA1, as causally contributing to breast cancer. Thus, the patients with BRCA1 mutations are grouped together whereas other types of breast cancer patients may be spaced further apart. When the parameters of the clustering algorithm are changed, for example if the clustering algorithm is changed so that something other than the BRCA1 mutation is the cause (lifestyle, environment, mutation), this distribution may change.

Figure 15:
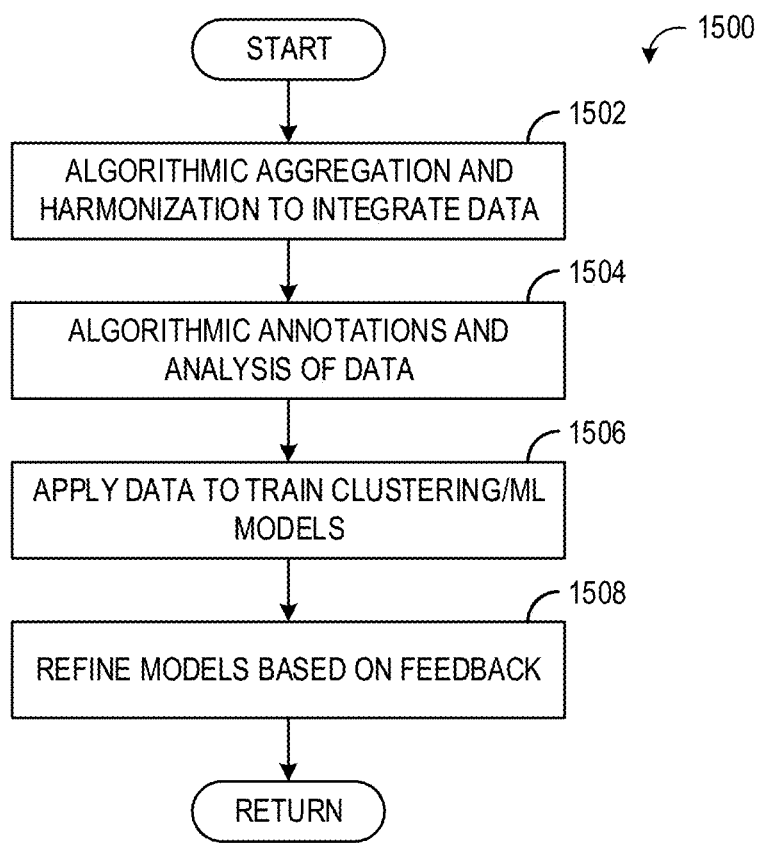
FIG. 15 is a flowchart illustrating an example method for training a machine learning model.

FIG. 15 is a flowchart illustrating a method 1500 for training one or more artificial intelligence models that may be applied to determine degrees of similarity among a plurality of data subjects (e.g., patients, stocks) in order to position the plurality of subjects of interest in 3D space. The artificial intelligence models may be clustering models, causal models, and/or other types of models and may be referred to generally herein as clustering/machine learning (ML). Method 1500 may be carried out according to instructions stored in non-transitory memory of a computing device, such as 3D visualization platform 102. Method 1500 is an example of an automated or semi-automated method for training ML models, but it is to be understood that other mechanisms could be used to obtain, annotate, and apply data to train the ML models described herein.

At 1502, training data is aggregated and harmonized via one or more algorithms in order to integrate the training data. For example, training data may be obtained that is intended to train a clustering model for a cohort of patients having a common medical diagnosis, such as breast cancer. The training data may be gene mutation data of a plurality of patients, gene expression data of a plurality of patients, patient treatment data of a plurality of patients, patient outcome data of a plurality of patients, and patient diagnostic data of a plurality of patients (e.g., mammogram images, CT images, pathology images, etc.). The training data may be obtained from a plurality of sources (e.g., various hospital databases, such as electronic health record databases, genomic databases, etc.), in different formats, etc. Thus, the different data in different formats from different sources may be aggregated and harmonized (e.g., converted into common formats). At 1504, annotations and analysis of the integrated data may be performed via one or more algorithms. The training data described above may include data for patients who have been diagnosed with breast cancer and data for patients who have been diagnosed with conditions other than breast cancer. Further, each individual datum of the training data may not have an indication of patient diagnoses associated with the datum. Thus, the annotation and analysis may be performed to annotate the training data with the breast cancer diagnosis or other ground truth information. Algorithmic annotation of the data may include analyzing the data via one or more algorithms that may be configured to automatically determine individual subjects of interest (e.g., patients) in the data, associate each identified subject of interest with an identifier (and each datum of that identified subject of interest with the identifier), classify/segment the training data by the subject of interest, and identify one or pieces of ground truth information (e.g., patient diagnosis, patient outcomes, etc.) for each subject of interest from that subject's data. Further, a summary metric may be determined for each related dataset of a given subject of interest. The data for each subject of interest may then be annotated with the ground truth information and/or calculated summary metrics.

As another example, pathology information for a plurality of patients may be automatically annotated based on a machine learning model trained to classify cells (e.g., as tumor cells or non-tumor cells) in H&E slides. A similar approach may be taken for diagnostic images. For example, a machine learning model may be applied to mammogram images, CT images, ultrasound images, and the like to identify and classify tumors (e.g., by size). Other types of automatic annotation and analysis may be performed depending on the model being trained, the training data, etc.

In some examples, the algorithmic annotation and analysis of the data may include identifying key information from large datasets. For example, the training data may include gene sequence information for one or more patients, where the gene sequence information may include a single-nucleotide polymorphism (SNP) panel, a mutation panel, entire sequences for a plurality of genes, or even a whole genome sequence. This gene sequence information may be too large to analyze and draw any meaningful conclusions, and thus key information from the gene sequence information may be identified. As an example, the gene sequence information may be compared to available genomic databases to identify mutations and/or SNPs, and these may be identified as the key information. In some examples, such as where the model that is to be trained is specific to breast cancer, genes of known interest to breast cancer (e.g., BRCA1, TP53, etc.) may be identified and gene sequence information (whether mutations, SNPs, or entire sequences) for the identified genes may be identified as the key information.

At 1506, the integrated, annotated, and analyzed data may be applied to train one or more clustering/ML models. The clustering/ML models may be suitable models, such as deep learning models (e.g., convolutional neural networks). The data may be used to adjust weights, biases, connections, etc., between nodes of the model(s). Further, a subset of the data may be used to validate the model(s). Once a model is trained and validated, the model may be deployed (as explained in more detail below) to position data objects in 3D display space. Feedback may be obtained when the model is deployed, and this feedback may be used to update the models, as indicated at 1508. The feedback may include user input indicating validity/accuracy of the models, updated training data (e.g., as the models are deployed, the datasets that are run through the models may also be stored as training data and used to update the models once sufficient data is obtained), and the like. Method 1500 then returns.

Figure 16:
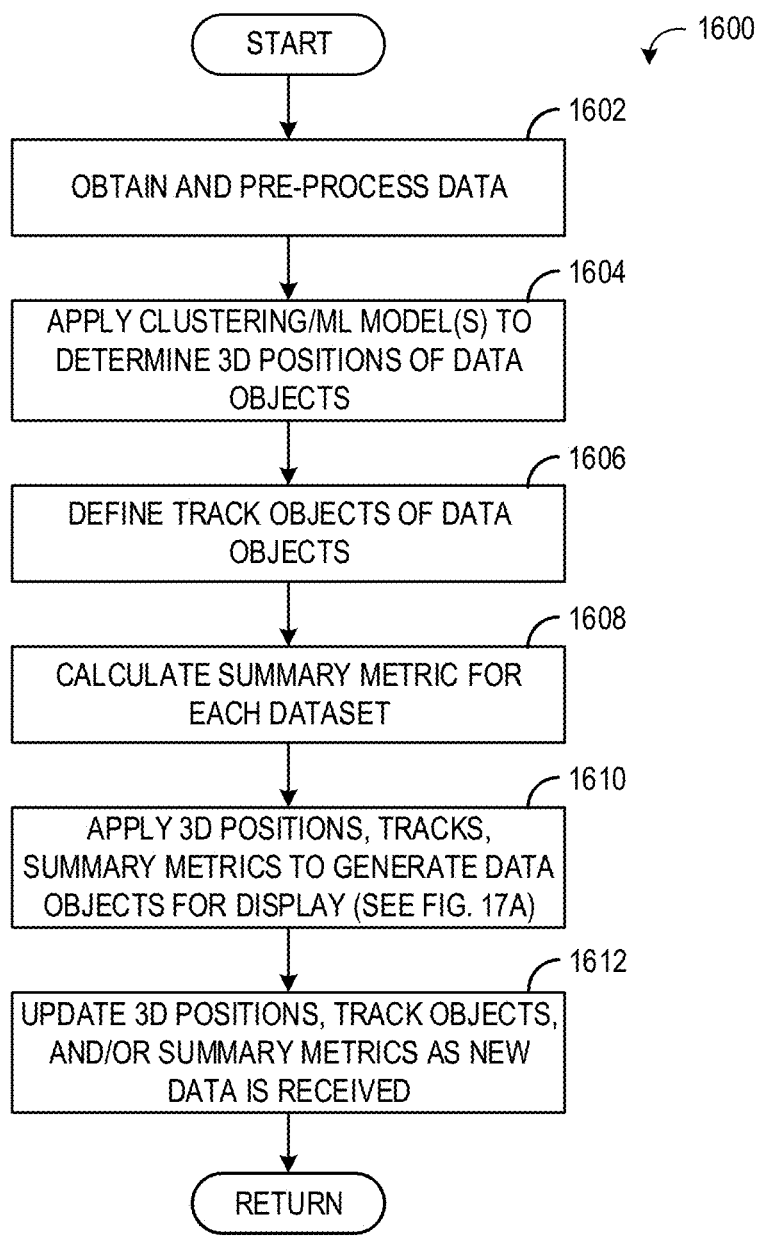
FIG. 16 is a flowchart illustrating an example method for generating 3D data objects with a 3D visualization system.

FIG. 16 is a flowchart illustrating a method 1600 for generating data objects to visualize multi-dimensional data via a 3D visualization platform. Method 1600 may be executed via instructions stored in non-transitory memory of a computing device, such as 3D visualization platform 102 of FIG. 1. At 1602, raw data that will be represented by one or more data objects is obtained and pre-processed. The raw data may include a plurality of sets of related datasets, where each set of related datasets is specific to a particular subject of interest, such as a patient. For example, a set of related datasets may include gene sequence data, gene expression data, diagnostic imaging data, treatment data, and outcomes data for a single patient. The raw data may include a plurality of such sets of related datasets, such that a plurality of subjects of interest (e.g., patients) are represented in the raw data. The raw data may be in the form of spreadsheets, variant call format, flat files (e.g., comma separated values), resilient distributed datasets, etc. The raw data may be obtained from a suitable storage location(s) via a suitable mechanism, such as via the integration server described above with respect to FIG. 1. Each dataset of the raw data may be associated with an identifier of the subject of interest (e.g., patient) that the data is specific to. The raw data may be pre-processed by normalizing the data values, omitting data values outside a target time window, or other operations. For example, the raw data may include measured metabolite levels for a plurality of patients. The metabolites may be measured in different units for different metabolites and even for the same metabolite but in different patients. The data may be pre-processed to normalize the metabolite data, for example relative to an average or "normal" value for a patient population.

At 1604, one or more clustering/ML models are applied to the pre-processed data to determine 3D positions of each data object represented in the raw data. The clustering/ML model(s) may be a suitable model(s) (such as a neural network or a causal AI model) that may be trained according to the method of FIG. 15. The clustering/ML model(s) may output. In some examples, a single clustering/ML model may be applied, which may generate output usable to position the plurality of data objects in 3D space. In some examples, two or more clustering/ML models may be applied, which may each generate output usable to position the plurality of data objects along a particular axis of 3D space. For example, a first clustering/ML model may generate output that may be applied to position the plurality of data objects along a first axis (e.g., an x axis) while a second clustering/ML model may generate output that may be applied to position the plurality of data objects along a second, different axis (e.g., a y axis) and a third clustering/

ML, model may generate output that may be applied to position the plurality of data objects along a third, different axis (e.g., a z axis).

At 1606, the track objects of each data object are defined. As explained above, each data object may represent a subject of interest (e.g., patient) that is associated with a set of related datasets. Each dataset for a subject of interest may be represented by a track object, which may be a longitudinal object that may include decorations or other indications of the underlying data. Each track object may have a length that is defined by how much data is in the underlying dataset and/or the amount of time over which the underlying data extends. Thus, each track object may be defined based on the information in the dataset represented by the data track. Further, any decorations that are associated with the track object may be defined based on comparison of the information in the dataset with external information, such as information stored in one or more data sources (e.g., reference database 112, image database 114, relational database 116, and/or environmental database 118). The external information may be used to identify key information in the dataset (e.g., mutations), organize/arrange the data for presentation via the track object (e.g., the external information may be used to classify each data point in the dataset so that related data points may be clustered together along the track object), and so forth.

At 1608, a summary metric is calculated for each dataset. The summary metric may be a value that indicates an aspect of the underlying dataset, such as an average value of the underlying dataset or a number of data points in the underlying dataset that have a certain feature (e.g., the number of mutations in the dataset). In some examples, the summary metric may be the result of a principal component analysis of the underlying dataset. In some examples, the summary metric may be based on the output from the clustering/ML model(s), for example an indication of how much that dataset contributed to the 3D positioning of that data object.

At 1610, the 3D positions, track objects, and summary metrics for each subject of interest may be applied to generate data objects for display via a 3D visualization browser, which will be explained in more detail below with respect to FIGS. 17A and 17B. Briefly, each data object may be displayed in 3D display space at the indicated 3D position. Each data object may include a hub object that represents the subject of interest and one or more axis objects that project outward from the hub object, with each axis object having a color and length that is based on the underlying data. For example, an axis object may represent gene sequence information for a patient, and thus may have a color (e.g., yellow) that indicates the axis objects represents gene sequence information and the axis object may have a length that indicates the summary metric for the gene sequence information for that patient (e.g., the mutation burden, where the axis object is longer when the mutation burden is higher). When requested, one or more track objects of one or more data objects may be displayed, where each track object has a color, a length, and one or more decorations that are based on the underlying data represented by that track object. Using the gene sequence axis object as an example, if the axis object is expanded to display the associated track object, the track object may be yellow, indicating the track includes gene sequence information. The track object may have a length that is based on how much gene sequence information is in the patient's gene sequence dataset, or a length that is based on a standard or average gene sequencing panel. For example, if the patient is part of a breast cancer cohort, the length of the track object may be based on a standard breast cancer mutation burden panel (whether or not that patient was actually tested for each mutation). The track object may include decorations (e.g., bars, donuts, cubes, etc.) that indicate each mutation present in the patient's tested tissue.

At 1612, method 1600 includes updating the 3D positions, track objects, and/or summary metrics as new data is received. In some examples, the data in one or more of the plurality of sets of related datasets may be updated over time. For example, as further diagnostic imaging is performed for a patient, additional data related to diagnostic imaging (e.g., actual images and/or findings from the diagnostic imaging) may be made available. As another example, a patient may have hormone levels, cytokine levels, metabolite levels, etc., tested multiple times, and each time new test results are obtained, those test results may be added to the appropriate dataset of the plurality of sets of related datasets. As new data is obtained, the new data may be reflected by updating the 3D positioning of one or more data objects (e.g., if the new data causes the clustering/ML model to output different 3D positioning results), updating the summary metric of one or more axis objects, and/or updating the track objects of one or more data objects.

In this way, temporal characteristics of data may be represented, whether those characteristics arise in "real time" or in "statistical time" (e.g., from different samples from a given data source at different time points). This may allow for intuitive visualization of predicted changes in status over real or statistical time based on predictive modeling to reflect predictions to reflect, e.g., changes in the model itself or to assess the effect of an intervention in a causal model, for example.

For example, decorations indicating data values attached to a given track object may be animated such that they are added at the end of a track as they are obtained from a data source or predicted, moved along the track as they are supplanted by new information at new time points, and eventually removed from view as they reach the end of the window of time represented by the track object.

As another example, the positions of hubs and associated objects in the three-dimensional space can be moved into different areas of the three-dimensional space based on changes in the output of a classification or predictive model, either into clustering positions based on the output of the model or into predefined regions of the three-dimensional space, such as into a region delineated within the three-dimensional space that indicates higher-concern subjects (patients, systems, stocks, etc.). These movements could be performed in either a stepwise, interactive fashion, particularly in the case of predictive modeling, or positions could be updated in "real time" from the user's perspective as new data and/or predictions are presented for visualization.

In a further example, additional data objects representing the actual or predicted data points can be generated alongside existing data objects to represent actual or predicted temporally ordered events. In the predictive case, multiple objects could be generated to represent the values based on differing predictions from, e.g., alternate model formulations or different potential interventions.

Figure 17A:
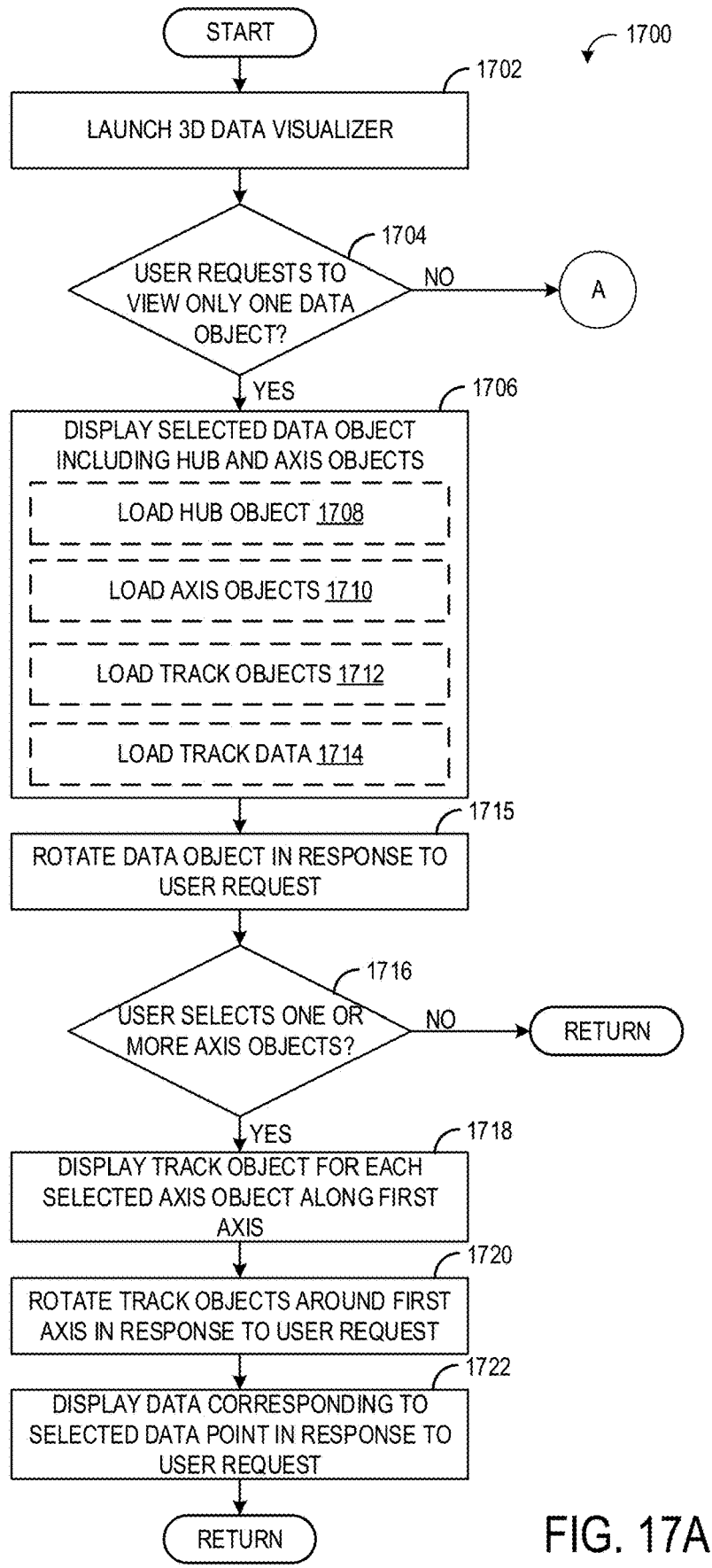
FIGS. 17A and 17B are flowcharts illustrating an example method for displaying 3D data objects via a 3D browser.
Figure 17B:
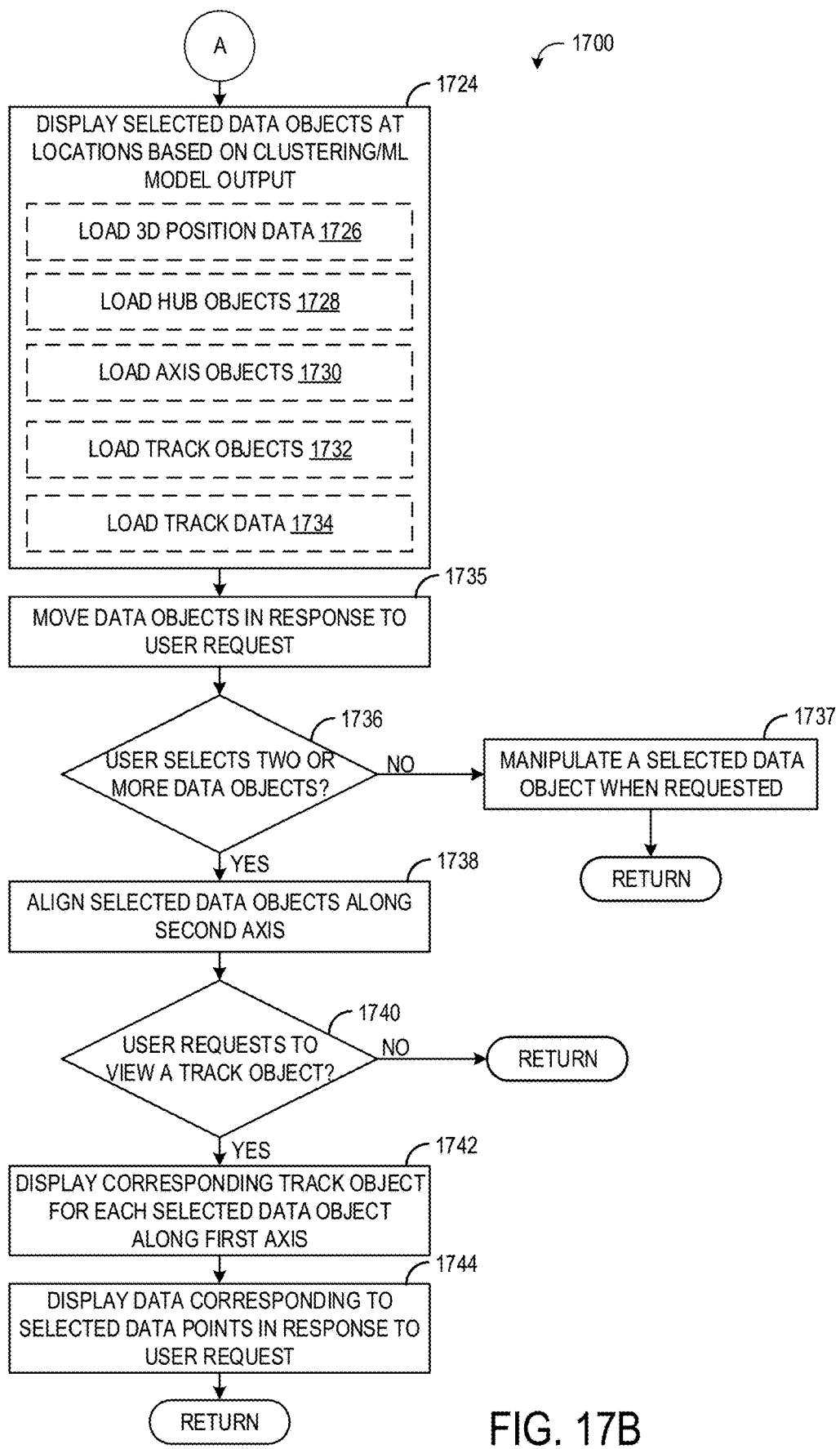

FIGS. 17A and 17B illustrate a method for visualizing data using a 3D visualization platform. Method 1700 may be executed via instructions stored in non-transitory memory of one or more computing devices, such as computing device 122 in combination with 3D visualization platform 102 of FIG. 1. At 1702, a 3D data visualization browser is launched on the computing device, such as 3D browser 124 launching on computing device 122. The 3D browser may be launched in response to a user request. At 1704, method 1700 includes determining if a user has requested to view only one data object. For example, upon launch of the 3D browser, the user may enter input specifying which datasets/subjects of interest the user would like to view via the 3D browser. If the user requests to view more than one data object, method 1700 proceeds to 1724 of FIG. 17B, which will be explained in more detail below.

If the user requests to view only one data object, method 1700 proceeds to 1706 to display the selected data object including a hub object and one or more axis objects. Displaying the selected data object may include loading the hub object for that data object, as indicated at 1708. The hub object may be generated by the 3D visualization platform, as explained above with respect to FIG. 16. The hub object may have a visual appearance that corresponds to the subject of interest. For example, if the subject of interest is a person, the hub object may be in the form of a person (e.g., a stick figure), such as hub object 202 of FIG. 2. Further, the hub object may include/be associated with a label identifying the data object (e.g., patient) represented by the hub object. For example, hub object 202 of FIG. 2 may include a label (CA6C3) that identifies the patient in a manner allowing the hub object/data object to be distinguished from any other data objects without including the actual identity of the patient.

Displaying the selected data object may include loading one or more axis objects for that data object, as indicated at 1710. The axis object(s) may be generated by the 3D visualization platform, as explained above with respect to FIG. 16. For example, the axis objects may be the axis objects 204, 206, 208, 210, and 212 of FIG. 2. The axis objects may have visual features that are based on the set of related datasets associated with the subject of interest. For example, each axis object may have a different color, with each color representing the category of data represented by that axis object (e.g., yellow for DNA information, green for RNA information, etc.). Each axis object may further have a length that represents the summary metric calculated for that axis object. Each axis object may be displayed so as to extend outward from the hub object on a first side of the hub object in a starburst formation, as explained above, though other display positions are possible without departing from the scope of this disclosure.

Displaying the selected data object may further include loading one or more track objects, as indicated at 1712, and loading track data, as indicated at 1714. The track object(s) may be generated by the 3D visualization platform, as explained above with respect to FIG. 16, and may have a visual appearance (e.g., color, length, decorations) that is based on the corresponding track data. As explained above, each dataset of the set of related datasets for the subject of interest may be represented by a track object, and some or all of the data points in each dataset may be displayable as part of the track object, as explained below.

At 1715, method 1700 may include rotating the data object in response to a user request. For example, the data object (including the hub object and one or more axis objects) may be displayed in a default orientation, such as the orientation shown in FIG. 2 (e.g., with the hub object vertically upright and the axis objects extending outward in a first general direction, such as to the left). The data object may be rotated or otherwise manipulated to view the data object at any orientation (e.g., rotate the data object to the right to view the axis objects in a more head-on position), in response to user input (e.g., the user may perform a select and drag operation on the data object to move the data object to desired orientation). Further, the user may make other adjustments to the data object, such as selecting which aspects to emphasize (e.g., the user may choose to view some but not all of the axis objects, change how one or more summary metrics are calculated, rank relative importance of each summary metric or data track, etc.).

At 1716, method 1700 determines if the user has selected one or more axis objects for further analysis. To select an axis object, the user may enter an input selecting the axis object itself (e.g., hovering a cursor over the axis object and selecting the axis object via a mouse click), selecting a representation of the axis object from a data legend (such as the legend shown in FIG. 3), or other suitable input. If the user does not select an axis object, method 1700 returns.

If the user selects one or more axis objects, method 1700 proceeds to 1718 to display a corresponding track object for each selected axis object, with each track object extending along a first axis. For example, if the user selects an axis object corresponding to a DNA dataset (e.g., axis object 204 of FIG. 2), the track object for the DNA dataset may be displayed (e.g., track object 402). The track object may be longitudinal, having a long axis that is parallel to a first axis of the data object. For example, if the hub object is in the form of a stick/cartoon figure (such as hub object 202), the first axis may extend perpendicular to a longitudinal/vertical axis of the hub object (e.g., perpendicular to a head-to-toe axis of hub object). In some examples, none of the axis objects may extend along the first axis (e.g., each axis object may extend outward from the hub object at a given non-zero angle relative to the first axis). Further, each track object may extend outward from a second side of the hub object, different (e.g., opposite) than the first side of the hub object from which the axis objects extend. When two or more track objects for the data object are displayed, the track objects may be displayed in a cylinder around the first axis, as shown in FIGS. 7 and 8 and described above.

At 1720, method 1700 may include rotating the displayed track objects around the first axis in response to a user request. As explained above, when multiple track objects for a data object are displayed, those track objects may be displayed around the first axis, in a cylinder-like fashion. This may result in some track objects being obscured by other track objects and/or some track objects being smaller than desired (e.g., to provide perspective). If a user wants to view a track object that is obscured, for example, the user may enter an input requesting to move the track objects. In response, the track objects will rotate around the first axis, such that the position of each track object is changed while maintaining relative positions of the track objects to each other.

At 1722, data corresponding to a selected data point may be displayed in response to a user request. For example, when a user hovers over a track object, any data that corresponds to that location of the track object may be displayed. As an example, referring to FIG. 8, information about a particular data point is displayed (e.g., the measured level for unconjugated estriol shown in banner 804) when that data point on a track object is selected (e.g., as indicated by cursor 802 of FIG. 8). The data that is displayed may include the data that makes up that data point on the track, e.g., a measured value for a hormone, cytokine, or other lab result; gene sequence information (e.g., presence or absence of a mutation or SNP); gene expression information; a diagnostic image or finding from a diagnostic image; an administered treatment; symptoms; side effects; a patient outcome; and so forth. Method 1700 then returns.

FIG. 17B is a continuation of method 1700. As explained above, at 1704 of method 1700, it may be determined if the user has selected only one data object to display. If the user has selected multiple data objects to display, method 1700 proceeds to 1724 of FIG. 17B. At 1724, the selected data objects are displayed at locations (e.g., in 3D display space) that are determined based on the clustering/ML model output. As explained above with respect to FIG. 16, the plurality of sets of related datasets may be entered into one or more clustering/ML models that may determine where each data object is to be displayed in 3D display space based on similarities and differences among the plurality of sets of related datasets. Accordingly, displaying the selected data objects may include, at 1726, loading the 3D position data as determined from the output of the clustering/ML model(s).

Displaying the selected data objects may further include loading hub objects at 1726 (with one hub object per subject of interest), loading axis objects at 1730 (with one or more axis objects per subject of interest), loading track objects at 1732 (with each track object corresponding to an axis object), and loading track data at 1734 (with each track object having a corresponding track dataset). The loading of the hub objects, axis objects, track objects, and track data performed to display the selected two or more data objects may be similar to the loading of the hub object, axis objects, track objects, and track data performed for the single data object described above at 1706. For example, a similar process may be performed for each selected data object. Further, each data object may be displayed in a default configuration and orientation that includes only the hub objects and axis objects being displayed (and not the track objects, at least initially); each hub object and corresponding axis objects may be displayed in the same default orientation as explained above for the single data object.

At 1735, method 1700 may include moving the data objects in response to a user request. For example, each data object (including the hub object and one or more axis objects) may be displayed in a default orientation, as explained above, such as the orientations shown in FIG. 9 (e.g., with each hub object vertically upright and the axis objects extending outward in a first general direction). The data objects may be rotated or otherwise manipulated to view the data objects at any orientation (e.g., rotate the data objects to the right to view the axis objects in a more head-on position), in response to user input (e.g., the user may perform a select and drag operation on the display space to move the data objects to desired orientation). In some examples, the orientations of all the data objects may be adjusted collectively (e.g., in response to a common user input). In some examples, individual data objects may be rotated or otherwise adjusted. Further, in some examples, the user may adjust which coordinates of the 3D space are displayed in order to view different clusters of data objects, zoom in or out of the 3D space, or otherwise navigate through the 3D space, which may result in the data objects being moved/adjusted on the display screen. Further still, the user may adjust how the data objects are positioned in 3D space by adjusting parameters of the applied clustering/ML, model(s) or adjusting which clustering/ML, model(s) are applied.

At 1736, method 1700 determines if the user has selected two or more data objects for further analysis. The user may select two or more data objects via one or more user inputs, e.g., via expanding a handle on a data object to "lasso" nearby data objects or via mouse clicks or touch inputs to each target data object followed by selection of a user interface button (e.g., such as one of the user interface buttons shown in FIG. 14) indicating to select those data objects for further analysis. If the user has not selected two or more data objects, method 1700 proceeds to manipulate a selected data object when requested. The manipulation of the selected data object may be performed similarly to the manipulation of the single data object explained above, e.g., one or more track objects of that data object may be displayed when requested and/or individual data points of the set of related datasets represented by the data object may be displayed. Method 1700 then returns.

If the user has selected two or more data objects, method 1700 proceeds to 1738 to align the selected data objects along a second axis. The second axis may be perpendicular to the first axis, and may be parallel to a vertical (e.g., head to toe) axis of the hub objects. For example, FIG. 12 shows a plurality of data objects (data objects 1104, 1108, 1106, and 1110) aligned along a second axis (axis 1201). When aligning the selected data objects, some or all of the selected data objects may be moved from their original positions in order to be aligned, and some or all of the selected data objects may be increased in size, reoriented, or otherwise adjusted so that the visualization of each data object is improved. For example, FIG. 11 shows a group of data objects that are selected for further analysis, and FIG. 12 shows how those data objects may be moved and adjusted in size when selected and aligned, in order to enhance visibility of those data objects. In some examples, when a group of data objects is selected, other data objects currently displayed that are not selected may be removed from the display area.

At 1740, method 1700 determines if the user has requested to view a track object, for example by selecting an axis object (e.g., directly on a data object or via the data legend or other mechanism). If the user has not requested to view a track object, method 1700 returns. It should be understood that, at any point of method 1700, when the method returns, displayed data object(s) may continue to be displayed and the method may loop back or proceed to any action based on received user input (e.g., data object manipulation, display of additional/different data objects, etc.) until user input is received requesting to exit the 3D browser. If the user has requested to view a track object, method 1700 proceeds to 1742 to display the corresponding track object for each selected data object along the first axis. When the two or more data objects have been selected as described above, a request to view a track object of one of the selected data objects may result in the same track objects of each of the selected data objects being displayed. For example, as shown in FIG. 12, the same type of track object (e.g., representing the same data category) is shown for each data object (e.g., a track object representing DNA information is displayed for each data object). While the same track object/category of track object for each selected data object is displayed, the track objects may have the same or different lengths, and may have the same and/or different decorations, depending on the underlying data represented by each track object.

At 1744, data corresponding to selected data points may be displayed in response to user request. For example, as explained above at 1722, when a user hovers over a track object, any data that corresponds to that location of the track object may be displayed. Method 1700 then returns.

In another representation, a method includes importing data from a data source to a first track object of a plurality of track objects, where the first track object is specified by a first key in a first notation input associated with the axis object, where the axis object is indicated for a destination of data from the data source, and where the notation input specifies the data source, and wherein the first key further comprises references to one or more locations on the axis object specifying subsets of related data from the data source. The method further includes, in response to a second user input, aligning the first track object with a second track object of the plurality of objects, wherein the second track object comprises a second set of data imported from the same or a different data source, and wherein the second set of data imported form the same or the different source is related but non-identical to the data imported into the first track object.

Aspects of the present disclosure are described herein with reference to flowchart illustrations and/or block diagrams of methods, apparatus, and computer program products according to the embodiments disclosed herein. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram blocks.

For purposes of illustration, specific data sources have been used. However, this is not intended as a limitation on the scope of the present disclosure. The embodiments of the present disclosure may be applied to any other document source such as VCF files, CSV files, other flat files such as TIFF, BAM, image files, text files and the like. In some examples, the other document source may comprise traditional SQL databases. The term "document" generally refers to a document or record and its associated data within a data source. Such documents may be in structured or unstructured formats. In some examples a "document" may be any object that includes or contains a list of key-value pairs, wherein each key is a string and the value is either another object, an array (that is, a list of objects) or a simple value that may be a string or a number. In other aspects the document may refer to an unstructured file object, such as a text of binary encoded file.

Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs, semiconductor devices based around a matrix of configurable logic blocks (CLBs), connected via programmable interconnects. FPGAs as discussed in this context can be reprogrammed to desired application or functionality requirements after manufacturing), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as platform 102 described with reference to FIG. 1. The methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

The foregoing described aspects depict different components contained within, or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

The invention claimed is:

1. A method for visualizing and manipulating multi-modal features of a plurality of data objects, the method comprising:
   accessing a plurality of datasets associated with a subject of interest, where data in the plurality of datasets changes in real-time;
   displaying a hub object comprising a representation of the subject of interest, the hub object comprising a representation of a summary metric of a respective medical dataset of the plurality of related medical datasets, including a first axis object that represents a first summary metric of a first medical dataset, a second axis object that represents a second summary metric of a second medical dataset, and a third axis object that represents a third summary metric of a third medical dataset, where each axis object projects away from the hub object at a different angle and each axis object has a different color, where each of the first axis object, second axis object, and third axis object has a length that is based on its corresponding summary metric;
   dynamically displaying the plurality of axis objects associated with the subject of interest, the plurality of axis objects each comprising a representation of a summary metric of respective dataset of the plurality of datasets and each displayed proximate the hub object, the dynamically displaying including adjusting a length and/or intensity of one or more of the plurality of axis objects as data in the plurality of datasets change; and
   in response to selection of a first axis object of the plurality of axis objects, displaying a first track object, the first track object including a plurality of representations of data points within a first dataset of the plurality of datasets.

2. The method of claim 1, wherein the hub object is a first hub object representing a first subject of interest of a plurality of subjects of interest, and wherein the first hub object is displayed at a location in 3D display space based on the data in the plurality of datasets relative to data associated with each of the plurality of subjects of interest.

3. The method of claim 2, wherein the location at which the first hub object is displayed is adjusted as data in the plurality of datasets changes.

4. The method of claim 1, wherein each axis object has a visual appearance based on a category of data of the respective dataset.

5. The method of claim 1, wherein each axis object has a different color selected based on a category of data of the respective dataset.

6. The method of claim 1, wherein the subject of interest is a patient and the plurality of datasets comprises a plurality of medical datasets of the patient.

7. The method of claim 1, wherein each axis object has a length based on a value of a corresponding summary metric.

8. The method of claim 1, further comprising calculating each summary metric by applying one or more dimensionality reduction techniques to each dataset.

9. A system for visualizing a plurality of data objects each associated with a respective set of axis objects in multiple dimensions, comprising:
   a display device;
   a computing device operably coupled to the display device and including memory storing instructions executable to:
      display, on the display device, the plurality of data objects, each data object representing a respective set of datasets associated with a respective subject of interest and each data object including a hub object and a set of axis objects associated with the hub object, the hub object comprising a representation of the respective subject of interest and each axis object comprising a representation of a respective summary metric of a respective dataset of the plurality of related medical respective set of datasets, including a first axis object of the set of axis objects that represents a first summary metric of a first medical dataset, a second axis object of the set of axis objects that represents a second summary metric of a second medical dataset, and a third axis object of the set of axis objects that represents a third summary metric of a third medical dataset, where each axis object of the set of axis objects projects away from the hub object at a different angle and each axis object has a different color, where each of the first axis object, second axis object, and third axis object has a length that is based on its corresponding summary metric;

and where the plurality of data objects are displayed at locations based on a clustering analysis of each set of related datasets;

responsive to a first user input, select two or more data objects of the plurality of data objects and aligning each selected data object along an axis; and responsive to a second user input, display a respective first track object of each selected data object, each first track object representing a respective plurality of data points of a respective dataset of the respective set of datasets.

10. The system of claim 9, wherein, each data object of the plurality of data objects represents a respective patient of a cohort of patients.

11. The system of claim 9, wherein each first track object is aligned along a second axis, perpendicular to the axis.

12. The system of claim 11, wherein each first track object represents a respective plurality of data points of a respective first dataset of the respective set of datasets, and wherein the instructions are further executable to display a respective second track object of each selected data object, each second track object representing a respective plurality of data points of a respective second dataset of the respective set of datasets, wherein each second track object is aligned along the second axis.

13. The system of claim 12, wherein each first track object has a first color and each second track object has a second, different color.

14. A system for visualizing a plurality of related medical datasets associated with a patient in multiple dimensions, comprising:

a display device;

a computing device operably coupled to the display device and including memory storing instructions executable to:

display, on the display device, a hub object and a plurality of axis objects associated with the hub object, the hub object comprising a representation of the patient and each axis object comprising a representation of a respective summary metric of a respective medical dataset of the plurality of related medical datasets, including a first axis object that represents a first summary metric of a first medical dataset, a second axis object that represents a second summary metric of a second medical dataset, and a third axis object that represents a third summary metric of a third medical dataset, where each axis object projects away from the hub object at a different angle and each axis object has a different color, where each of the first axis object, second axis object, and third axis object has a length that is based on its corresponding summary metric;

responsive to one or more first user inputs, display, on the display, one or more track objects each representing a respective plurality of data points of a respective medical dataset of the plurality of related medical datasets; and responsive to a second user input, adjust a display location of each displayed track object while maintaining a positional relationship among each displayed track object.

15. The system of claim 14, wherein the plurality of related medical datasets comprises a genomic dataset, a transcriptome dataset, an imaging dataset, a treatment dataset, and an outcomes dataset.

16. The system of claim 14, wherein the track objects are arranged in a cylinder-like fashion around an axis and the track objects rotate around the axis in response to the second user input.

17. The system of claim 14, wherein a first track object of the one or more track objects represents data in the first medical dataset and includes one or more decorations, each decoration indicating information about a respective data point of the first medical dataset.

18. The system of claim 14, wherein the one or more track objects includes a first track object representing data in the first medical dataset, and wherein the instructions are further executable to, responsive to a third user input to the first track object, display information of an individual data point of the first medical dataset.

19. The system of claim 14, wherein each summary metric is calculated by applying one or more dimensionality reduction techniques to each medical dataset.

* * * * *